(12) United States Patent
Basler

(10) Patent No.: US 7,325,997 B2
(45) Date of Patent: Feb. 5, 2008

(54) SYSTEM, CLAMPING ELEMENT AND COUNTER-ELEMENT FOR THE CONNECTOR OF PROFILED ELEMENTS

(76) Inventor: Norbert Basler, Kornstrasse 29A, D-38154 Königslutter (DE)

( * ) Notice: Subject to any disclaimer, the term of this patent is extended or adjusted under 35 U.S.C. 154(b) by 148 days.

(21) Appl. No.: 10/484,897

(22) PCT Filed: Aug. 2, 2002

(86) PCT No.: PCT/DE02/02835

§ 371 (c)(1), (2), (4) Date: Jan. 27, 2004

(87) PCT Pub. No.: WO03/014580

PCT Pub. Date: Feb. 20, 2003

(65) Prior Publication Data

US 2004/0213631 A1    Oct. 28, 2004

(30) Foreign Application Priority Data

Aug. 3, 2001 (DE) ............................... 101 38 269
Jul. 9, 2002 (DE) ............................... 102 31 018

(51) Int. Cl.
*F16B 7/04* (2006.01)
(52) U.S. Cl. ............... 403/391; 403/389; 403/396; 403/399; 52/282.4; 52/282.5
(58) Field of Classification Search ............... 248/67.5, 248/67.7, 72, 229.12, 228.3, 316.4; 403/389, 403/391, 396, 399; 52/655.1, 282.5, 282.4
See application file for complete search history.

(56) References Cited

U.S. PATENT DOCUMENTS

| 429,357 | A | * | 6/1890 | McBee ...................... 403/391 |
| 2,400,512 | A | | 5/1946 | Hurtel |
| 3,146,982 | A | * | 9/1964 | Budnick ................ 248/229.15 |
| 3,319,983 | A | | 5/1967 | Zibell |
| 3,357,731 | A | | 12/1967 | Piget |
| 3,380,786 | A | | 4/1968 | Petersen |
| 3,497,249 | A | | 2/1970 | Bois |
| 3,856,244 | A | * | 12/1974 | Menshen ................... 248/67.5 |
| 4,993,862 | A | | 2/1991 | Pelta |
| 5,181,680 | A | * | 1/1993 | Coll ............................ 248/61 |
| 5,794,897 | A | * | 8/1998 | Jobin et al. ................. 403/391 |

(Continued)

FOREIGN PATENT DOCUMENTS

DE    GM 18 19 226    4/1960

(Continued)

*Primary Examiner*—Daniel P. Stodola
*Assistant Examiner*—Michael P. Ferguson
(74) *Attorney, Agent, or Firm*—Greenblum & Bernstein, P.L.C.

(57) ABSTRACT

System for connecting profile elements includes a separate clamping element having a clamping plate and at least one protrusion and a separate locking element having a base plate and at least one protrusion. In an assembled state, the locking element butts against that side of the profile elements located opposite the clamping element, such that protrusions of the locking element and of the clamping element are directed toward one another. A device is utilizes to clamp the clamping element and the locking element together such that, in the assembled state, the profile elements are clamped in between the clamping element and the locking element. The device being guided centrally between the profile elements.

11 Claims, 17 Drawing Sheets

U.S. PATENT DOCUMENTS 5,931,423 A * 8/1999 Heideloff .................. 248/74.4

FOREIGN PATENT DOCUMENTS

| DE | GM 18 13 367 | 6/1960 |
| DE | GM 19 93 277 | 9/1968 |
| DE | 79 06 753 U1 | 8/1979 |
| DE | 32 44 864 A1 | 6/1983 |
| DE | 295 07 651 U1 | 9/1995 |
| EP | 0 032 418 A1 | 7/1981 |
| FR | 2 653 183 * | 12/1989 |
| GB | 966 351 A | 8/1964 |

* cited by examiner

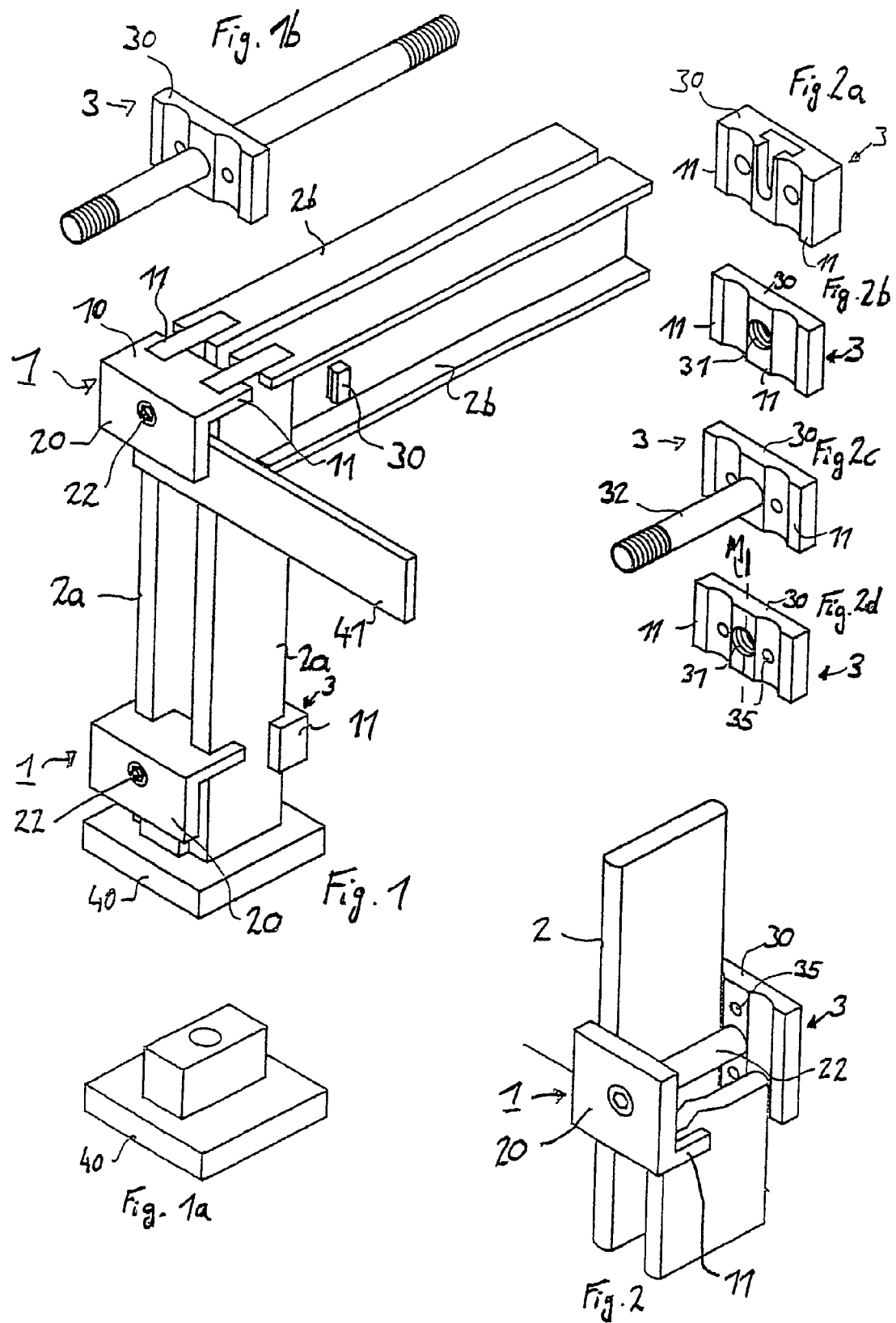

SYSTEM, CLAMPING ELEMENT AND COUNTER-ELEMENT FOR THE CONNECTOR OF PROFILED ELEMENTS

BACKGROUND OF THE INVENTION

1. Field of the Invention

The invention relates to a system, a clamping element and a locking element for connecting profile elements. The system and the clamping or locking elements are suitable, in particular, for the universal fastening of structural parts, in particular of profiles and panels on profile elements and/or for connecting profile elements to one another, to fixed objects or to add-on parts.

2. Background Description

In order to erect racks, wall claddings, storage means, fair stands or the like which can be adjusted in a variety of ways, can be subjected to high loading and can be assembled and dismantled as desired, use has usually been made up until now of profiles which have periodically repeating recesses such as holes or notches. The smaller the spacings between these recesses, the more precisely can the elements fitted on the profiles be adjusted. Racks of small to medium size usually have four profiles which are used as uprights and into which shelves are screwed. Racks with side walls which are designed in one piece are known as an alternative to this.

The disadvantage of all the known designs is the need for producing the recesses in the profiles or uprights, use being made of customary production methods such as punching, drilling or milling. A high level of variability requires small unit spacings, which involve increased outlay if they are to be produced in relatively thick profile. In general, such load-bearing structures with periodically repeating recesses cannot be adjusted with the desired precision.

SUMMARY OF THE INVENTION

Taking this prior art as the departure point, the object of the invention is to provide a system, a clamping element and a locking element for connecting profile elements by means of which maximum levels of adjustability and specific load-bearing capacity and low outlay during the production and assembly of, as far as possible, commercially available profiles is possible.

This object is achieved according to the invention by a system having the features of claim 1, a clamping element having the features of claim 17 and a locking element having the features of claim 26. Advantageous configurations and developments of the invention are given in the subclaims.

The system for connecting profile elements has a clamping element which comprises a clamping plate and at least one protrusion which is oriented at least essentially at right angles to the clamping plate and serves as a stop or abutment for profile elements. This clamping element connects both add-on parts to profile elements and the profile elements to one another. This makes it possible for separate rods to be accommodated by the clamping elements such that they are secured in position in relation to one another. Also provided is a locking element with a base plate and at least one protrusion perpendicular to the base plate as a stop for a profile element, it being the case that, in the assembled state, the locking element butts against that side of the profile element which is located opposite the clamping element, such that the protrusions of the locking element and of the clamping element are directed toward one another.

In the assembled state, the protrusions engage around the profile element or the profile elements or butt against the same. Formed on the clamping plate and on the locking element are devices for bracing the same in the direction of one another, the profile elements being subjected to a permanent pressing force of the locking element and of the clamping plate, with the result that, in the assembled state, the profile elements are clamped in between the clamping element and the locking element and at least one side of the profile element butts against a wall of the protrusions which is located perpendicularly to the clamping element and the locking element. The devices for bracing purposes are guided through essentially centrally between the profile elements, with the result that central force introduction takes place; as a result of the devices being guided through between two profile elements, the latter remain intact, so there is no need for any additional machining, such as drilling, of the profile elements. Loose fastening or positioning of the clamping element and of the locking element allows for length compensation and displaceability of the elements in relation to one another.

In order to avoid tilting in particular of multi-part profile elements, provision is made for the devices for exerting the necessary tensile stress and/or for bracing purposes to be arranged essentially along the center axis of the protrusions or, in the case of two or more protrusions, between the protrusions or in a mirror-symmetrical manner in relation to the center axis of the clamping plate. The protrusions may be formed by recesses in a base part fastened on the clamping plate or the base plate of the clamping or locking element, for example by milling out the profile elements of corresponding grooves or the like.

The clamping element is advantageously designed in one piece and can easily be produced by forging or drop-forging or by a primary forming method. Such a primary forming method, for example precision casting, also makes it possible to cast complicated geometrical structures and to prepare threads, so that only a low level of outlay is required for subsequent machining. It is also possible for production to take place by cutting machining using drills and milling cutters or by some other cutting methods, e.g. using lasers or the like.

As an alternative to this, the clamping plate and the protrusions or the base part are designed as separate parts, the advantage here residing in straightforward production. It is possible for the protrusion and clamping plate to be produced as straightforward punched parts and then to be connected to one another or fastened on one another. This connecting operation can take place subsequently by straightforward screw connection or by the two parts being welded, placed in position one inside the other, plugged in or adhesively bonded, depending on the use purpose of the clamping element.

In order to realize a connection between the clamping element and locking element which is as inexpensive and durable as possible, the devices for bracing purposes are designed as tie rods, threads, clips, wedge leadthroughs, hooks, nut mounts, recesses, eccentric clamps or undercuts. In this way, it is possible to produce a durable and releaseable connection by screw connection or the introduction of stay bolts, toggles, wedges or the like without expensive special fabrication methods having to be utilized. In addition to a bore or a thread, the introduction location for the required tensile stress may also be designed as a slot or as a stay bolt or plate. It is possible for the tie rods or stay bolts to be integrally formed on, or designed in one piece with, the clamping plate or the locking element.

The areas in which the system can be used are extended if cable bushings, coatings, profile recesses or protective elements are arranged on the clamping plate, on the profile side or remote from the profile. Cables can thus be laid in an unobtrusive and reliable manner, and the profiles are protected by the coatings or protective elements and/or the coating provides insulation or makes it easier for the clamping plate to be retained on the add-on part. Corresponding profile recesses allow transverse, diagonal or longitudinal strut arrangements or further fastening elements to be hooked or introduced into the clamping element.

Provided on the clamping plate, in a development of the invention, are mounts, in particular transverse grooves, for components for bracing or stiffening purposes, in particular in the direction transverse to the orientation of the profile elements. Such mounts may also be formed on the protrusions. Bores, sleeves, threads, bolts, pins, milled reliefs or undercuts are likewise arranged on the clamping plate, the arrangement of bolts or pins having the advantage that these can serve as hinges. In particular in the case of fair constructions, it is thus possible to produce any desired forms with display walls and alterable partitions.

In order to fasten the clamping element securely even in the case of smooth and hard profile elements, it is provided that the clamping plate or the base part is, or may be, provided with at least one cutting edge, preferably between two protrusions, which cuts into the profile and produces a form-fitting connection. This results in an indent being produced in the profile element during assembly and the application of a corresponding tensile force, said indent ensuring additional hold for the clamping element and/or the add-on part fastened to the clamping element.

In order for it to be possible for add-on parts to be easily arranged, and securely clamped, on the profile element, a clearance for accommodating these add-on parts is formed, in a development, between the clamping plate and the profile element, this clearance being dimensioned either such that, in the assembled state, the add-on part can be fitted and/or plugged in or such that a clamping action occurs between the add-on part and the profile element. It is thus possible, for example, either just to plug in an angled profile, in order to rest a panel thereon, or else a corresponding angled formation is initially introduced between the clamping plate and profile element and, by virtue of the tensile forces being applied via the devices described above, this structural element is clamped to the profile element or profile elements. The devices for bracing purposes here are expediently arranged in a displaceable manner, for example in a slot, on the far side of a clearance-forming shoulder in order for it to be possible, by way of different levers, to bring about appropriate force introduction. The protrusions here are arranged, or integrally formed, on the shoulder.

An increase in the clamping action and compensation of the surface pressure is achieved if the clamping plate is designed to be inclined or curved in the direction of the protrusion, particularly gentle and uniform clamping being achieved when the clamping plate is designed to be resilient in the direction of the profile element. A further advantage consists in that round material, which can be fastened by the curvature, is forced downward in the direction of the protrusion, this ensuring secure fastening essentially irrespective of the diameter of the round material since the possibility of sliding upward is prevented. By virtue of the curvature, an abutment is integrated in the clamping plate.

In order to ensure, as far as possible, optimum guidance of the profile element, it is possible for the protrusions or the protrusions and the bracing devices or the recesses in the base part to enclose the profile element or elements on three sides. In particular in the case of panel-like profile elements, this configuration prevents tilting of the profile elements in relation to one another and in respect of the profile element, as a result of which the stability of the system is additionally increased.

In order further to increase the reliability, in particular in the case of systems which are set up in the vicinity of walls or ceilings, it is provided that the locking element has bores or recesses for fastening on a wall. The locking element may thus be screwed to, or hooked into, the wall or ceiling or the floor, this making it possible to achieve increased reliability and stability of the system as a whole.

A development provides for protrusions for enclosing the profile element, ribbing or retention devices to be formed on the locking element, these ensuring, in conjunction with the recess or recesses in the clamping element, that the profile elements or element are/is secured. The ribbing or retention devices is/are designed in accordance with the profile element and may constitute a negative, for example, of structuring of the profile element. It is also possible to provide mounts, in particular transverse screws, for components for bracing or fastening purposes, in particular in the direction transverse to the orientation of the profile elements. Bores, sleeves, threads, bolts, pins, milled reliefs or undercuts are likewise arranged on the locking element, the arrangement of bolts or pins having the advantage that these can serve as hinges. It is thus possible for strut arrangements and components or structural parts optionally also to be arranged on the rear side or on both sides.

A development of the invention provides that a clamping element, as has been described above, is formed on the locking element on the rear side or at an angle to the base plate. This makes it possible to achieve the situation where any desired number of profile elements can be arranged one behind the other or one beside the other, so that relatively long constructions, racks, uprights, etc. can be assembled and erected. Connecting a locking element and clamping element to form one component, be this by the two being designed in one piece or being screw-connected, welded, adhesively bonded or the like, produces a connecting part or coupling part, a so-called "assembly joint", which opens up a large number of design possibilities. It is thus possible for rectilinear structural elements, with the use of different coupling parts, to realize polygons with different angles, depending on how the coupling parts are designed. If the "rear sides" of a locking element and a clamping element are directed toward one another, this achieves an aligned extension, while using angled positioning achieves a non-linear configuration.

The profile elements may be designed as separate tubes, bars, rails or panel-like structural elements or else also as U-shaped, I-shaped, H-shaped, L-shaped or M-shaped profiles. Designing the profile elements separately results in increased flexibility and variability, whereas designing various preformed profiles increases the stability.

The clamping element is designed for connecting profile elements to one another, to fixed objects or to add-on parts. It comprises a clamping plate and at least one protrusion perpendicular to the clamping plate as a stop for a profile element, the protrusion being designed such that at least one side of the profile element can be positioned against a wall of the protrusion which is located perpendicularly to the clamping plate. Furthermore, devices for bracing with the profile elements are provided on the clamping element, it being the case that the devices are arranged essentially centrally or in a mirror-symmetrical manner in relation to a center axis of the clamping plate.

The advantage with this clamping element is that, in particular in the case of profile elements mounted on the wall or fastened on a fixed object, corresponding add-on parts can be attached in a straightforward, quick and variable manner.

Arranged on the protrusions are mounts for bracing or stiffening elements, in particular in the direction transverse to the orientation of the profile elements, bores, threads, bolts, pins, milled reliefs, fastening devices or undercuts, in order to achieve a maximum level of variability. It is also possible for the clamping element to be designed in a number of parts, the components being designed such that they can be displaced or rotated in relation to one another, in order to allow rotation of the profile elements or to facilitate angled assembly.

It is also possible for the protrusions themselves to be designed in a number of parts, in particular in a number of layers, the layers being arranged axially one behind the other in the bracing direction.

The protrusions and the devices for bracing purposes are preferably arranged on the clamping element such that the profile elements can be arranged between two protrusions, between one protrusion and one device or between two devices.

A locking element is preferably designed to correspond to the clamping element, so that what has been said in relation to the clamping element applies correspondingly.

The invention is explained in more detail hereinbelow with reference to exemplary embodiments. The same structural elements have the same designations in different figures. For reasons of clarity, not all the designations are given in all the figures. In the figures:

BRIEF DESCRIPTION OF THE DRAWINGS

FIG. 1 shows a detail of an assembled system;

FIG. 1a shows a view, in detail form, of a supporting foot; FIG. 1b shows a locking element;

FIG. 2 shows a system mounted on a wall;

FIGS. 2a,b,c,d show locking elements illustrated on their own;

DETAILED DESCRIPTION OF EMBODIMENTS OF THE INVENTION

Figure 3:
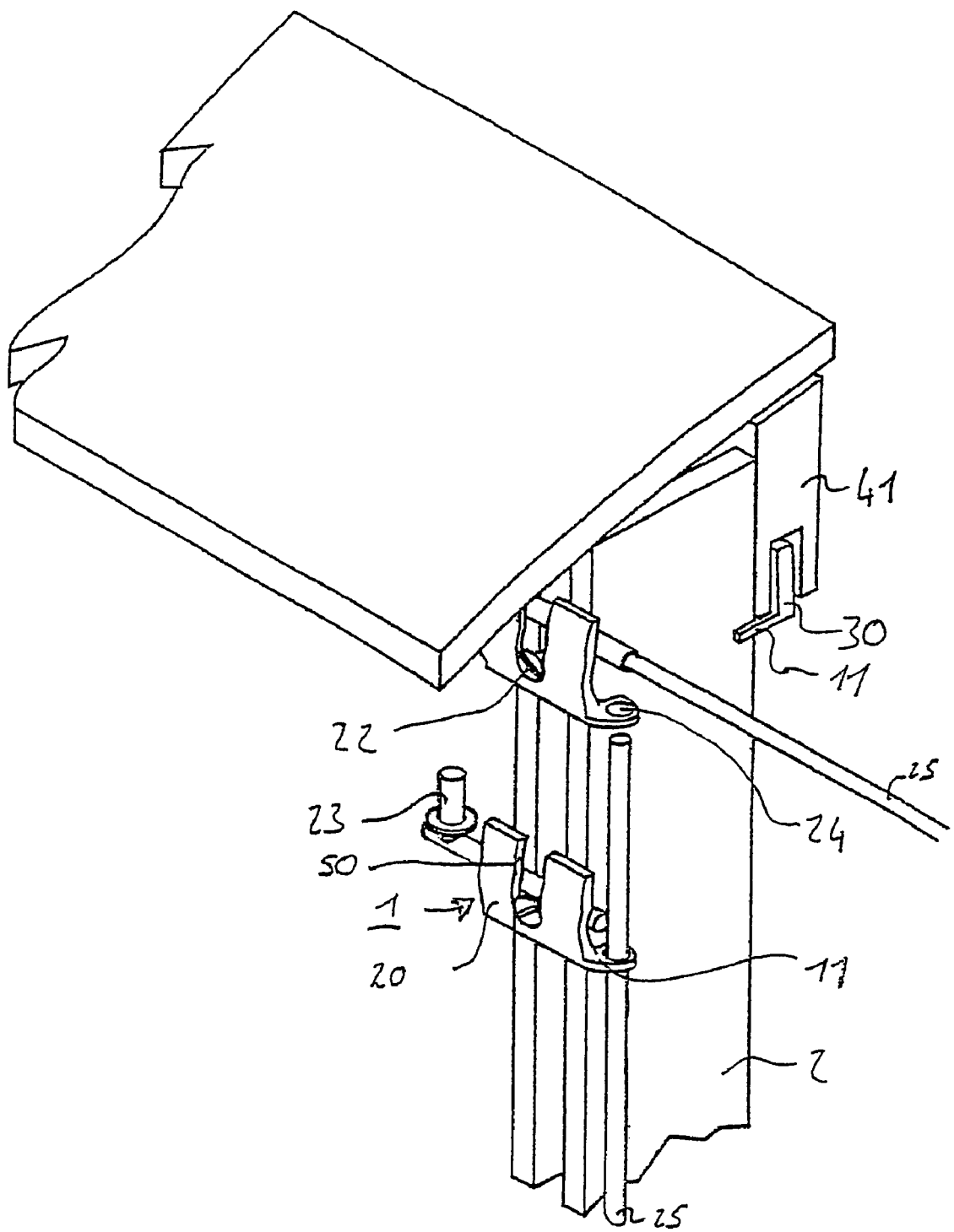
FIG. 3 shows a partial illustration of a variant of the system used as a fence.

FIG. 1 shows a system for connecting profile elements 2 via a clamping element 1, which interacts with a locking element 3 via devices for bracing the clamping element 1 with the locking element 3. The detail of a table or of a trestle which is illustrated here shows two profile elements 2a which are designed as panels or rails with a rectangular cross section. These profile elements 2a are arranged separately and extend vertically in the longitudinal direction in order to form a corresponding upright or a table leg or support.

Arranged at the bottom end of the profile elements 2a is a foot 40, which is illustrated in detail in FIG. 1a. The two profile elements 2a are oriented parallel to one another and are partially enclosed on their narrow sides by the clamping element 1, more precisely by the protrusions 11 which project from a base part 10 arranged on the clamping plate 20. Arranged on the other side of the profile elements 2a is a locking element 3, of which the protrusions 11 likewise encloses the profile elements 2a and thus fixes the latter in position in relation to one another.

The clamping element 1 and the locking element 3 are braced in relation to one another via a screw 22, the foot 40 likewise being clamped in. By virtue of the screws 22, the profile elements 2a, the foot 40 and the clamping element 1 and the locking element 3 are braced in relation to one another. In addition to the profile elements 2a being reliably positioned in relation to one another, the add-on part, in the form of a foot 40, is thus also fixed in a vertically adjustable manner.

A clamping element 1 is likewise arranged at the top end of the two vertical profile elements 2a, and the construction of this clamping element will be described in detail at a later stage of the text. Parallel to the longitudinal sides of the profile elements 2a, further profile elements 2b extend at right angles thereto, these further profile elements having a U-shaped cross section and the openings of the Us being oriented in opposite directions. Openings are produced in the connection between the two legs of the U-shaped profile 2b, and a protrusion of the locking element 3 engages in these openings, as a result of which this locking element is connected in a form-fitting manner to the profile elements 2b. Likewise via a screw 22, the clamping element 1 is then braced with the locking element arranged between the profile elements 2b, with the result that the horizontally oriented profile elements 2b are connected to the vertical profile elements 2a, this producing an angle on which, for example, a table top or the like can be set down.

It is also the case on the top clamping element 1, via bracing of the top clamping element 1 with the correspondingly arranged locking element 3, which has, for example, a thread in which the screw 22 can engage, that a connection or strut arrangement 41 is secured as a support on the vertically oriented profile elements 2a. As a result of the straightforward construction of the profile elements 2a, 2b and the commercially available elements 4 bracing the clamping elements 1 with the locking elements 3, quick construction and dismantling, adjustment and adaptation and also cost-effective production of the system and of the components or structural parts is possible.

FIG. 1b shows the locking element 3 which is used in FIG. 1, and has two tie rods projecting through it, it being possible for the corresponding forces to be introduced at these tie rods via nuts. One tie rod here can serve for mounting in a wall or some other structural part and, at the same time, acts as a spacer in relation to the wall or the structural part, while the other tie rod serves for applying the clamping forces between the clamping element 1 and the locking element 3.

FIG. 2 illustrates a similar system, in the case of which the locking element 3 is fastened on a wall and has a thread 31, as is illustrated in FIG. 2b or 2d, in which the screw 22 can engage for bracing the clamping element 1 with the locking element 3. The profile elements 2, designed as metal strips here, are secured against buckling laterally by protrusions 11 in the clamping element 1 and the locking element 3. Fastening the locking element 3 on the wall increases the stability, for example, of a rack structure or makes it possible to configure the latter with two uprights and merely to provide load-bearing arms, which are arranged on the system.

Whereas in FIG. 2 the locking element 3, with bores 35 arranged on the central crosspiece, can be fastened on the wall, for example a side wall, a ceiling or a floor, in FIG. 2d the bores 35 are produced in recesses of the locking element 3, with the result that the respective fastening means, preferably screws, secure the locking element 3 in a recessed state. The device for bracing with the clamping element 1 is designed in FIG. 2d as a bore which is provided with a thread 31 and is located along a center axis M, in FIG. 2c as a tie rod 32, and in FIG. 2b likewise as a threaded bore 31 arranged centrally between two profile elements, the locking element 3 in FIG. 2b not having any separate bores for wall-fastening purposes. The locking element 3 illustrated forms something of a universal locking element which, if required, is provided with appropriate fastening means, for example with a slot for a screw head. It is possible here for the locking element 3 to be connected to the wall in some other way, for example welded, or possibly adhesively bonded, for example to a metal wall. The recesses and protrusions 11 in the locking element 3 each serve for guiding the separate profile elements 2 and may analogously be designed as recesses in the base part 10 for forming protrusions 11. FIG. 2a shows a variant in which an undercut is produced in the locking element 3, it being possible for a corresponding bracing element to be introduced into said undercut.

FIG. 3 shows an alternative construction of the system in a use example as a fence, in the case of which, once again, two separate profile elements 2 are arranged vertically and form an upright. The clamping element 1 illustrated in this exemplary embodiment interacts with the locking element 3 by the same principle as has been described with reference to FIG. 1 or 2, although in this case the clamping plate 20 contains a slot 50 into which the screw 22, which subjects the locking element 3 to the tensile forces, can be introduced. It is thus possible for the screw 22, in the first instance, to be preassembled on the locking element 3 and for the clamping element 1 to be pushed in via the slot 50 and moved to the desired position before the screw 22 is tightened, in order to brace the profile elements 2, the locking element 3 and the clamping element 1 in relation to one another.

FIG. 3 clearly shows a protrusion 11 on the locking element 3, by means of which the profile element 2 is prevented from yielding laterally. It can likewise be seen here that an add-on part in the form of a support 41 is inserted in a clearance, on the part of the locking element, for this purpose. Depending on the configuration of the clearance, the support 41, designed as a covering angle, is either plugged in loosely or secured on the profile element or elements 2. Furthermore, mounts 24 for round bodies such as cables, tubes, wires, bars or stiffening elements are provided on the clamping element 1, these mounts, in the present case, being designed as bores.

It is likewise possible for the stiffening elements 25 or fence posts to be inserted such that they are secured on the profile elements 2 by the clamping element. In order for it to be possible to ensure reliable positioning, while maintaining a wide range of possible variations, it is possible, in an advantageous configuration, to provide, in the contact regions, a polygonal profiles or corresponding undercuts, by means of which the stiffening elements are fixed in addition to the clamping on the profile elements 2 and the clamping element 1. In particular in order for it to be possible for doors or walls to be fitted easily, a bolt 23, which acts as a hinge, is provided on the clamping element 1. This makes it possible, in particular in the case of fair construction, to produce a variety of forms and variable structures without major structural measures having to be taken, in particular it is possible for walls to be pivoted or door structures to be realized via door hooks. In addition to the bolt 23 being formed integrally on the clamping element 1, provision is made for this bolt to be subsequently screwed in or fastened on the clamping element 1 in some other way.

Figure 4:
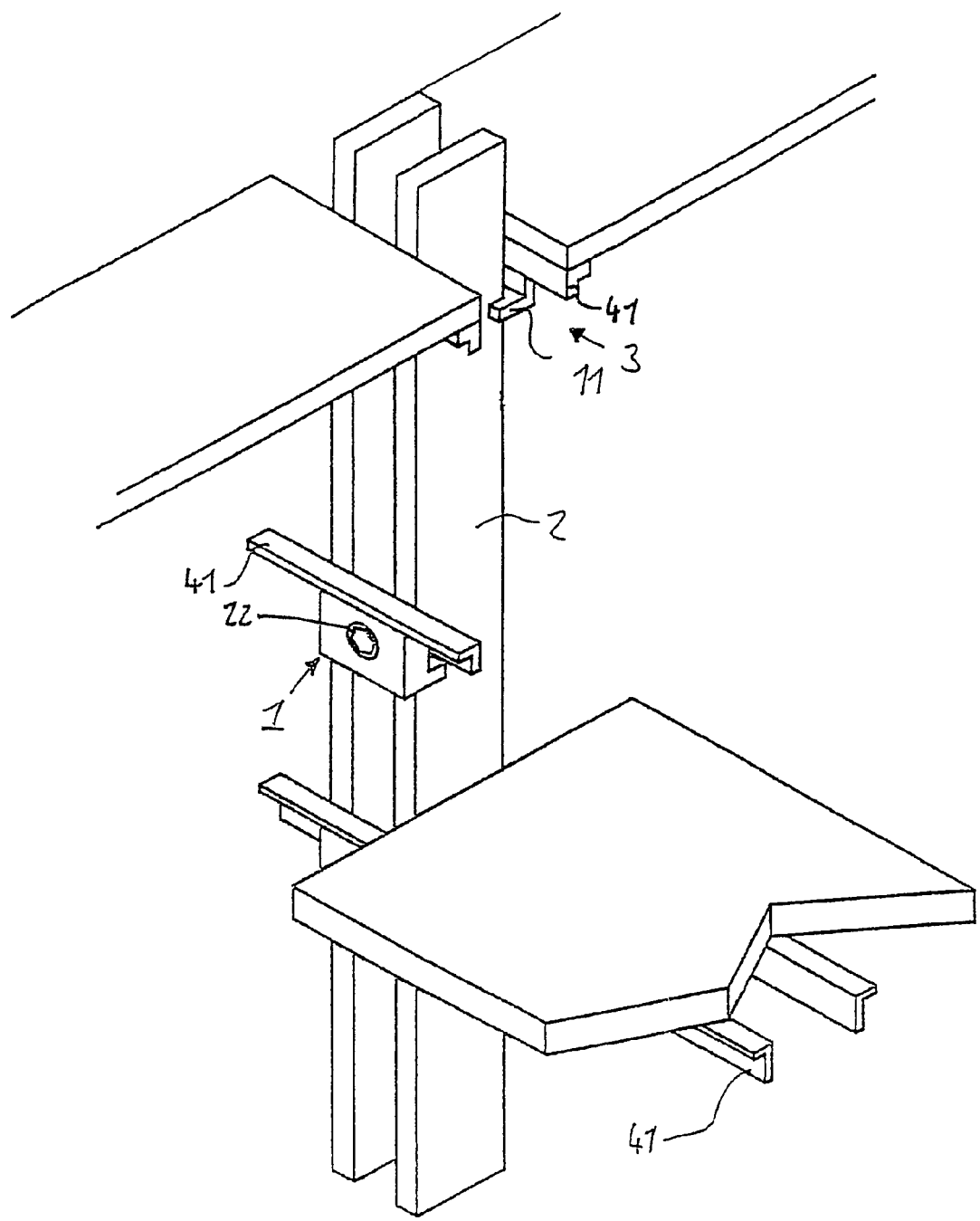
FIG. 4 shows the system used as a storage means.

FIG. 4 shows an example of a rack structure in the case of which supports 41 can be fastened on the profile elements 2 at any height, even in a state in which they are tilted through 90°, via the clamping element 1 and the locking element 3. The supports 41 form the base for panels or grates, on which the respective articles can be set down. On account of the clamping principle, it is possible for the heights to be adjusted as desired and in a stepless manner. Simply by virtue of releasing and tightening the screw 22, it is possible for adjustment to be carried out without the shelves being removed. The various configurations of the supports 41 make it possible to use carriers as end supports or as bearing means which run beneath the panels, or to fasten the shelves in various orientations on the upright. In the present exemplary embodiment, the supports 41 are designed as angled profiles, although alternative configurations are possible. The angled profile, however, has the advantage that the shelves are provided with reliable support against bending. Round profiles or strip-like supports 41 are conceivable as an alternative.

Figure 5:
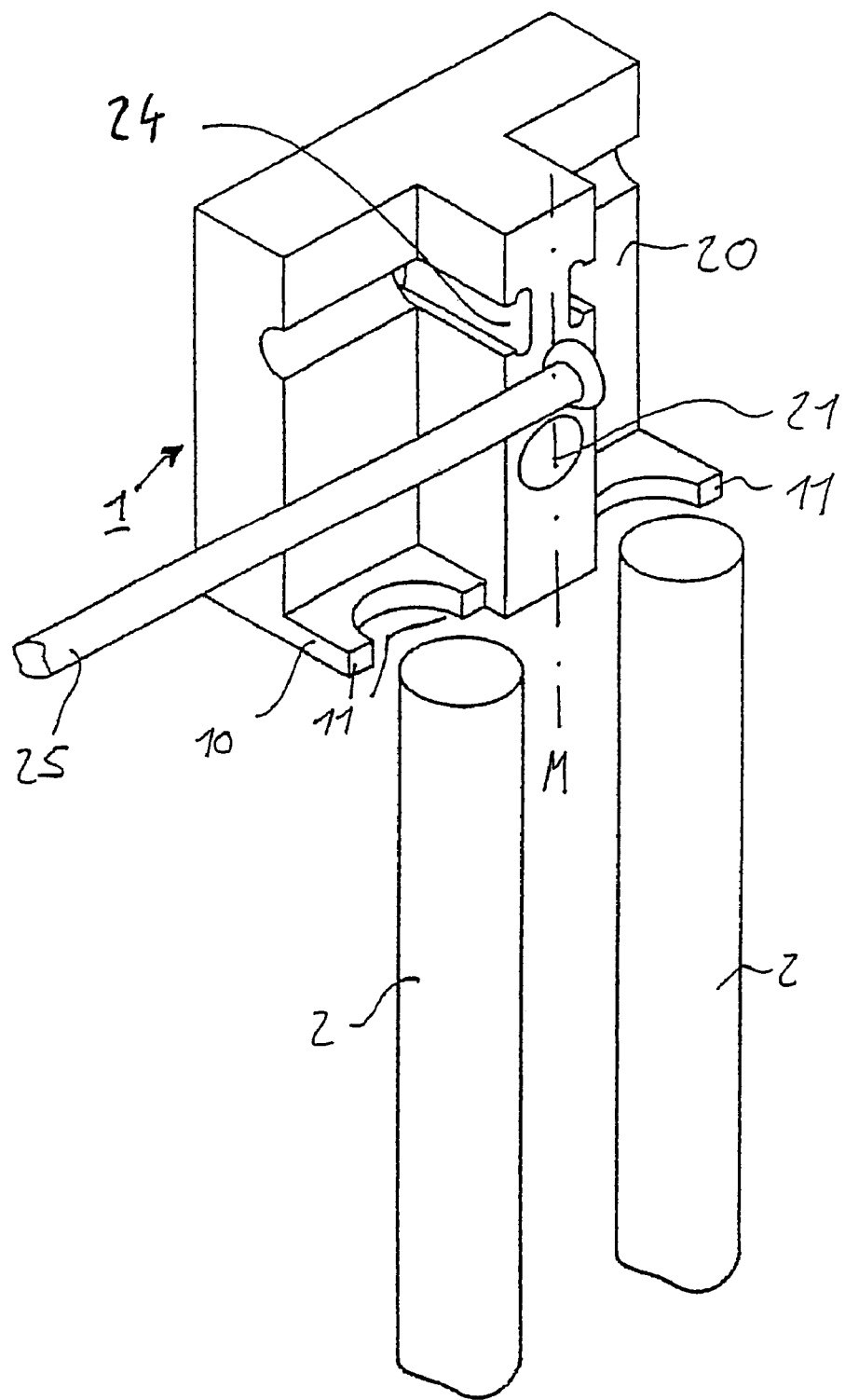
FIG. 5 shows a clamping element for accommodating round objects.

In FIG. 5, the profile elements 2 are designed as round bodies and the corresponding protrusions 11 in the clamping element 1 are likewise rounded. The rounding which is formed by the protrusions 11 here is large enough to ensure sufficient lateral fixing, with the result that the clamping forces to apply are kept within justifiable limits. In the present case, the clamping plate 20 is designed for connecting profile structures which are isolated from one another. Recesses are produced in the central crosspiece of the clamping plate 20, and the undercuts of these recesses correspond with head shapes at the ends of the round elements which are to be clamped in. A form fit prevents the clamped-in profiles from slipping out laterally or coming into contact with one another.

If the clamping plates 20 and the locking elements 3 are produced from insulating material, or are covered with such a material, connection to electrically conductive materials is possible. Current-carrying systems for example for low-voltage luminaires may thus be formed. The bore 21 shown here serves for accommodating a screw or a tie rod for bracing with the locking element 3 and is arranged along the center axis M between two profile elements 2.

A mount 24 is also produced, preferably milled in, it being possible for a metal as conductor and/or stiffening 25 to be introduced therein. The central crosspiece of the clamping plate has milled into it an appropriate profile via which forces can be absorbed in a form-fitting manner, with the result that a good stiffening action is achieved and slipping out is prevented. Likewise produced in the central crosspiece of the clamping plate 20 is a bore 21 or a thread, via which the locking element 3 (not illustrated) can be subjected to the corresponding tensile forces. Here too, the advantage resides in the easy availability of the profile elements 2, which can be used as uprights, and in the universal usability and the capability for stepless adjustment along with a simultaneously high specific load-bearing capacity.

Figure 6:
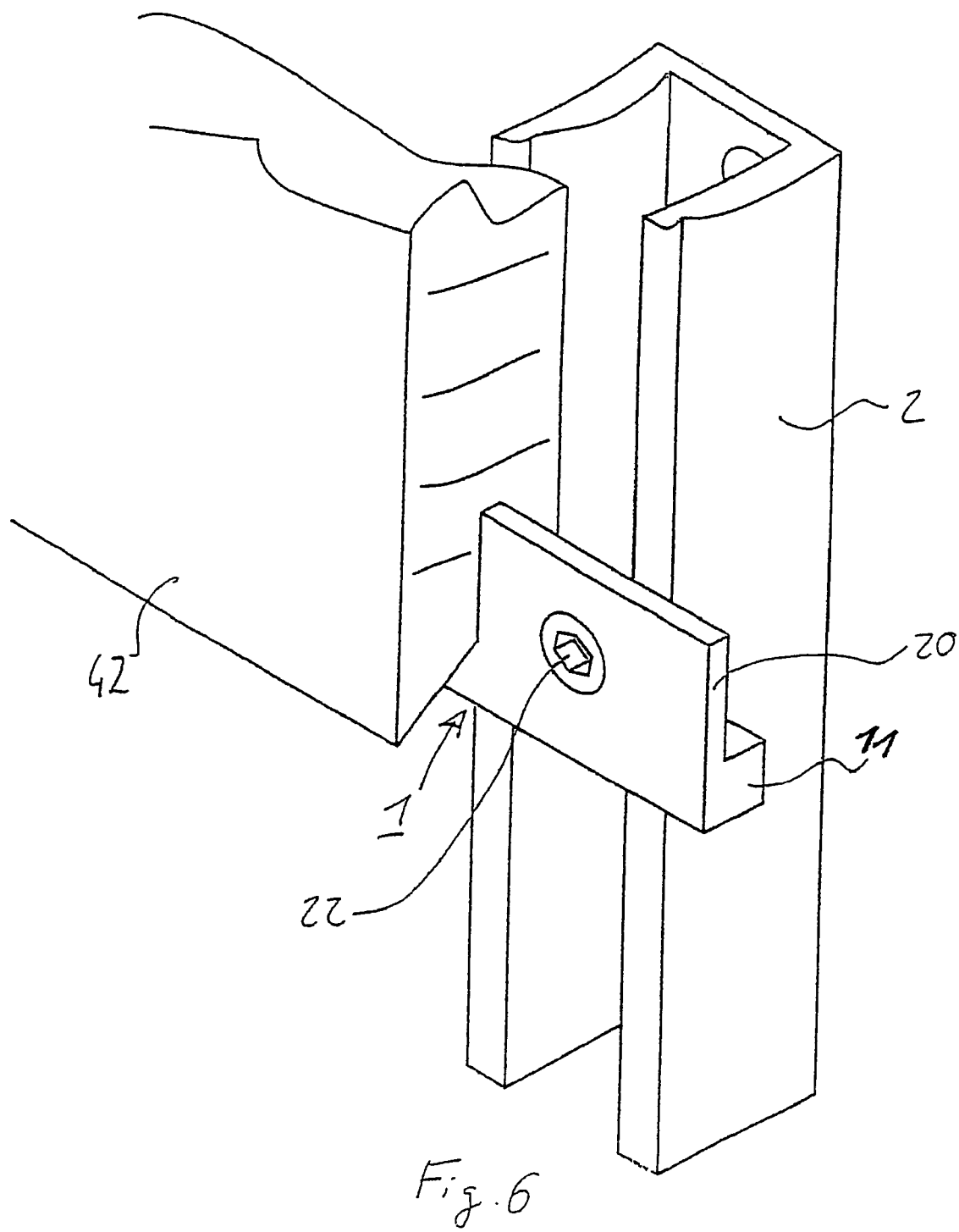
FIG. 6 shows an example of the clamping element used as a cladding fastening.

As an alternative to the embodiments which have been described up until now, FIG. 6 illustrates an exemplary embodiment in the case of which the profile element 2 is fastened directly on the wall, or ceiling or floor, via the screw 22 and the clamping element 1. The abutment, analogous to the locking element 3, is thus formed by the wall and serves for absorbing the tensile forces via which the clamping element 1 is secured on the profile element 2, which in FIG. 6 is designed as a U-shaped profile. The screw 22, which engages for example in a plug inserted into the wall, fastens the profile element 2, the clamping element 1 and a wall cladding 42 on the wall, which is advantageous, for example for setting up display boards or for fastening facade panels, screens, pin boards or tool holders or the like.

Figure 7:
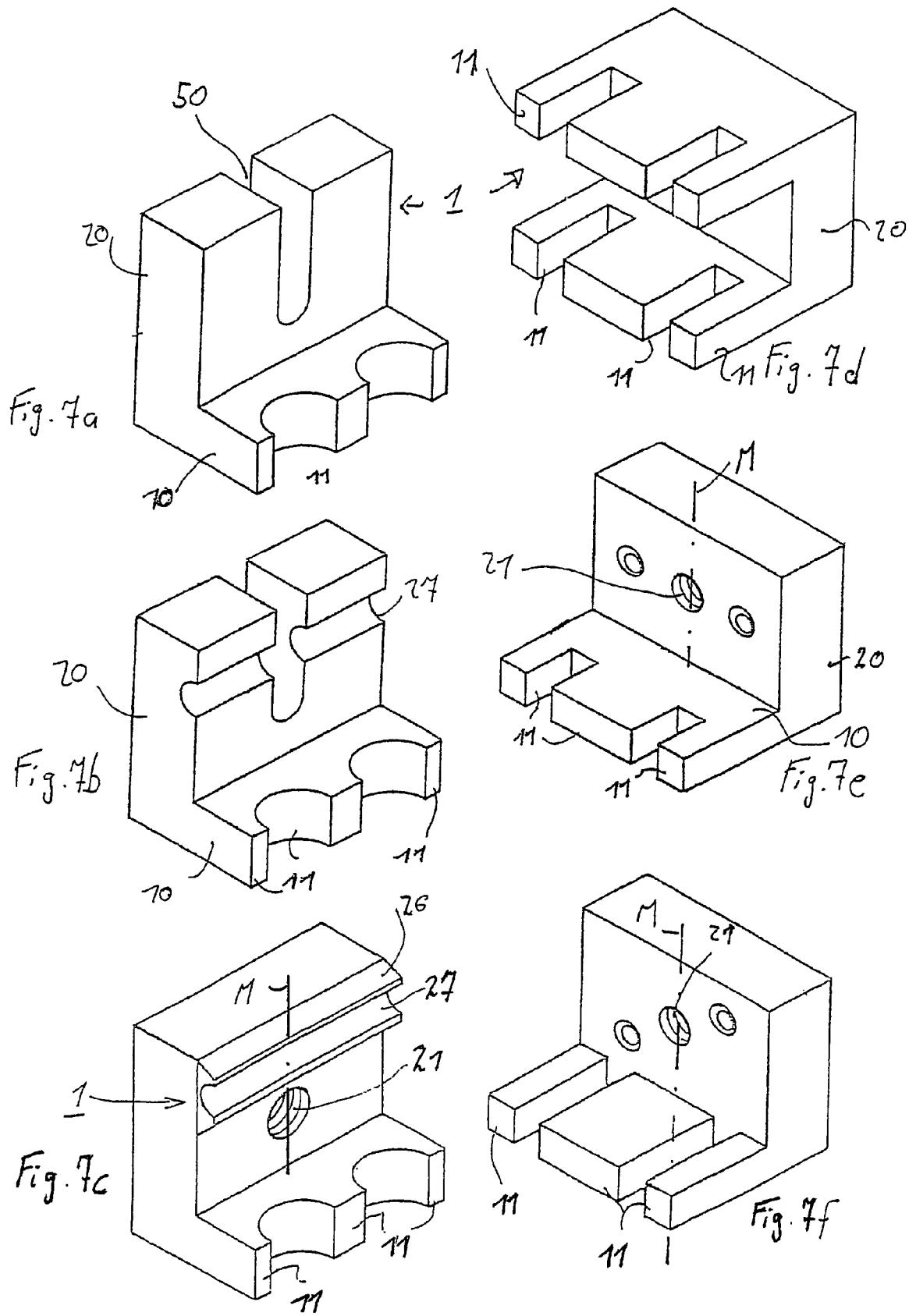
FIGS. 7a-7f show clamping elements illustrated on their own.

FIGS. 7a-7f each show configurations of clamping elements 1 which are adapted to the respective use purpose. FIG. 7a shows a clamping element 1 with a base part 10 and the clamping plate 20, which is designed perpendicularly to the base part and in which is formed a slot 50 for the introduction of a tie rod or a screw. The recesses produced in the base part 10 form protrusions 11, which in this case are of round design and serve for accommodating correspondingly shaped profile elements 2. The recesses did not extend right up to the clamping plate 20, this resulting, in the assembled state, in a clearance in which a corresponding add-on part can be positioned or clamped.

FIG. 7b illustrates a clamping element 1 corresponding to FIG. 7a, although the clamping plate 20 has a milled relief for a round-material or cable bushing 27. In this way, on the one hand, add-on parts can be clamped firmly to the corresponding profile elements 2 and, at the same time, any cables which are necessary can be guided in a satisfactory manner.

A corresponding round-material or cable guide 27 is also shown in FIG. 7c, this, in a manner similar to FIG. 7a, being designed for round profile elements 2 but, instead of a slot 50, having a threaded bore 21 as the device for bracing with the locking element 3 (not illustrated) along the center axis M. As an alternative to the milled relief according to FIG. 7b, the cable guide 27 is designed as a formation in a protective element 26 which projects from the clamping plate 20 in the direction of the profile element 2. This protective element 26 may be produced from plastic in order to avoid impressions on, and damage to, the surface of the profile elements 2.

FIG. 7d clearly shows the task of the protrusions 11 as recesses in the base part or base parts 10. In this case, the clamping plate 20 extends between the two parallel base parts 10, which have congruent recesses and protrusions 11 in each case. By virtue of the recesses, which are designed as slots and into which the corresponding sections of the profile elements 2 for example panels or U-shaped profiles, are introduced, a first position-fixing step is carried out, and lateral yielding of the profile elements 2 is prevented by the resulting protrusions 11.

FIGS. 7e and 7f show clamping elements 1 with threaded bores 21 which are arranged along the center axis M of the clamping element 1 and are intended for exerting the clamping forces. The threaded bores 21 are arranged centrally in relation to the protrusions 11, so that there are no tilting moments in respect of the profile elements 2. In addition, on both sides of the threaded bores 21, additional fixing holes are provided with threads, into which add-on parts or holders can be screwed. Whereas a clamping element 1 according to the configuration of FIG. 7e still has a crosspiece or base part 10 on the clamping plate 20, this crosspiece or base part providing the spacing on the clamping plate 20 from the profile elements 2, the protrusions 11 in FIG. 7f begin directly on the clamping plate 20, as a result of which the latter butts directly against the profile elements 2 in the assembled state. The crosspiece in FIG. 7e acts as an abutment for clamping purposes, as a result of which the clamped-in components or structural parts are securely fixed.

Figure 8:
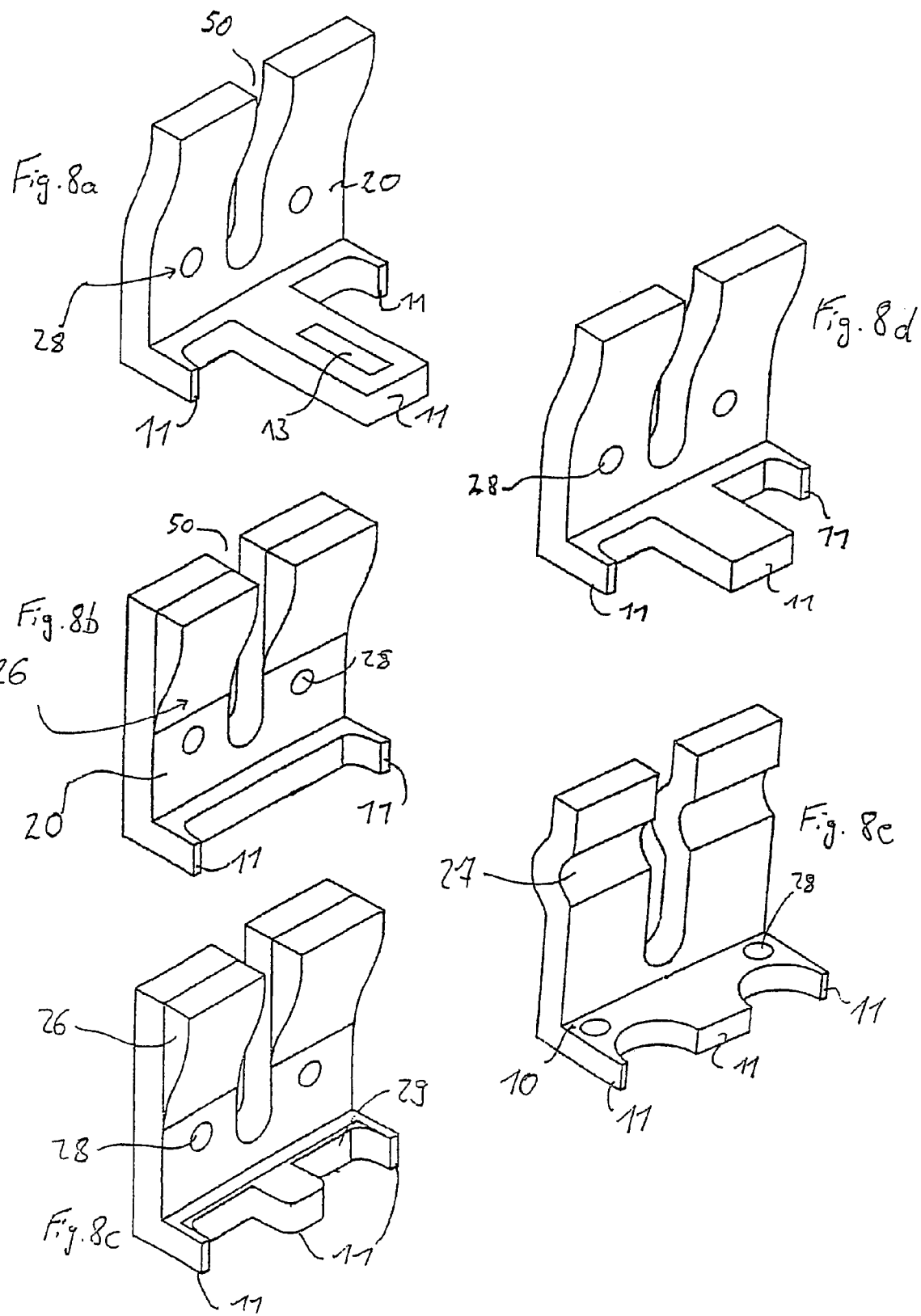
FIGS. 8a-8e show clamping elements illustrated on their own.

FIGS. 8a-8e show further configurations of the clamping elements 1, and in FIG. 8a, in addition to the corresponding devices for exerting the tensile forces on the clamping plate 20, such a device 13 is also provided on the base part. This device comprises a protrusion 11 in which is produced a recess 13, into which, for example, a wedge can be introduced. This produces a straightforward wedge connection between the profile elements 2 which are positioned between the protrusions 11, and the locking element 3, which has a corresponding recess for the through-passage of the tongue 13. In addition, bores 28 are provided in the clamping plate 20, in order to fit add-on parts or to lead through, or clamp in, corresponding cables or components or structural parts, for example diagonal strut arrangements.

FIG. 8b shows a variant of the clamping element 1 in the case of which two lateral protrusions 11 are provided, which is possible, for example, with box profiles as profile element 2 or correspondingly stable U-shaped profiles. Instead of the curved configuration in FIG. 8a or 8d, a protective element 26 is fastened on the clamping plate 20 in order to protect the profile elements 2, or the clamped-in components or its structural parts, against pressure marks. Uniform pressure distribution is likewise achieved as a result. The slot 50 for accommodating the screw 22 or a corresponding tie rod 32 is arranged centrally in relation to the protrusions 11, in order to achieve uniform bracing of the clamping element 1 and locking element 3 with the profile element 2.

FIG. 8c shows a variant of FIG. 8c, albeit with three protrusions 11, which have a coating 29 produced between them, so that it is also the case at this contact location that the profile element 2 is not damaged in any way or insulation is provided.

FIG. 8d illustrates a variant of FIG. 8a in the case of which the central protrusion 11 does not have a recess for forming a wedge connection. The extended, central protrusion 11 serves for increasing the stability in fixing the separate profile elements 2 or fastening/supports of components or structural parts. Here too, the clamping plate 20 is of curved design, as a result of which the resilient abutment and uniform surface pressure against the profile elements 2 can be achieved or round material can be clamped straightforwardly.

In FIG. 8e, a round-material or cable bushing 27 is produced in the clamping plate 20 for example by means of a deformation method such as bending or pressing.

The base part 10, furthermore, contains bores 28 into which it is possible to introduce, for example, pins or bolts for forming a hinge.

Figure 9:
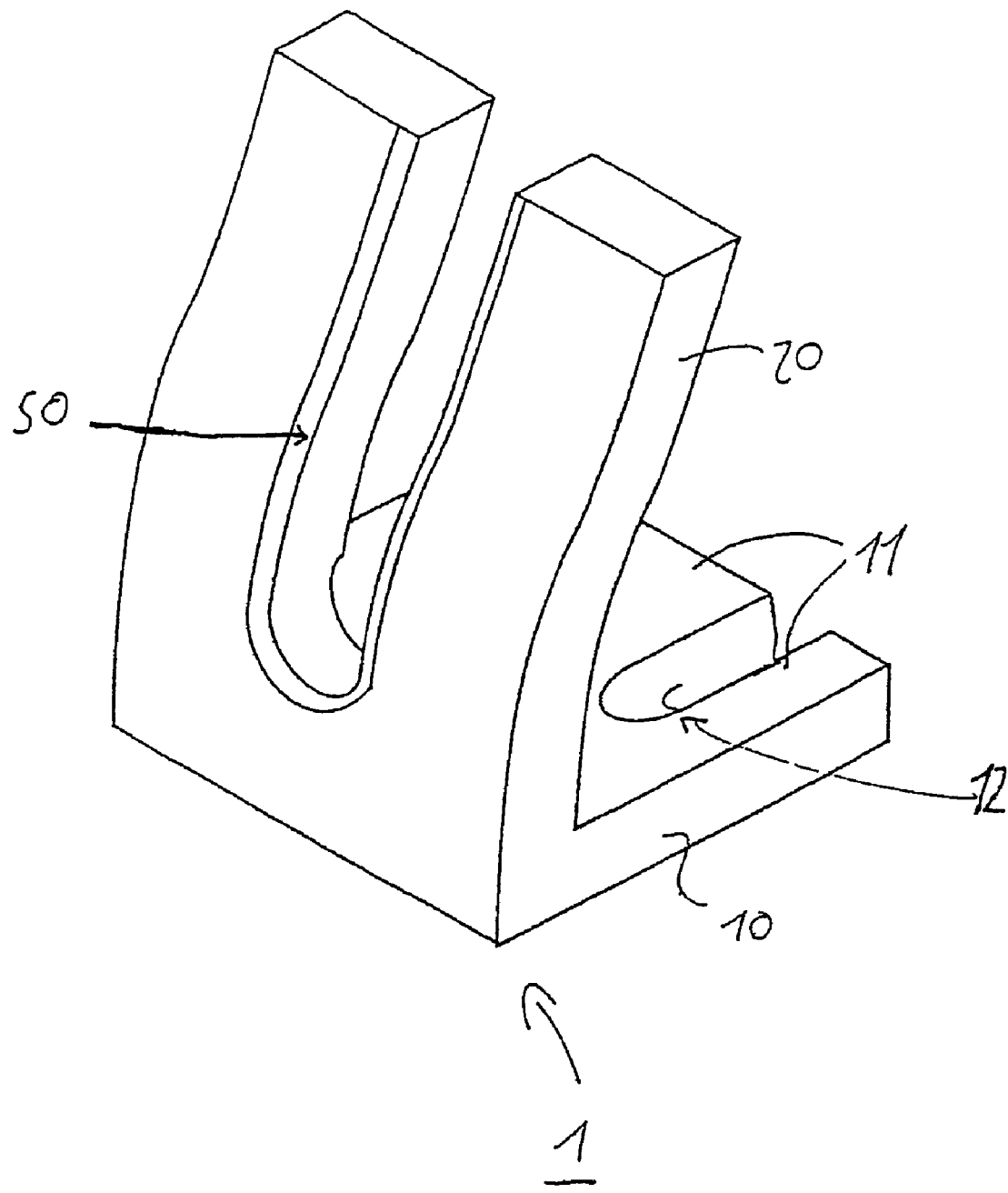
FIG. 9 shows a clamping element with a curved clamping plate.

FIG. 9 shows a clamping element 1 with protrusions 11 on the base part 10, there being formed, at least between two protrusions 11, a cutting edge 12, by means of which it is possible to improve the fastening on the profile elements 2 (not illustrated). The clamping plate 20 is inclined in the direction of the profile element 2 and has a slot for accommodating a screw 22, a hook or a wedge. The angle between the clamping plate 20 and the base part 10, at least in the end region of the clamping plate 20, is less than 90°.

Figure 10:
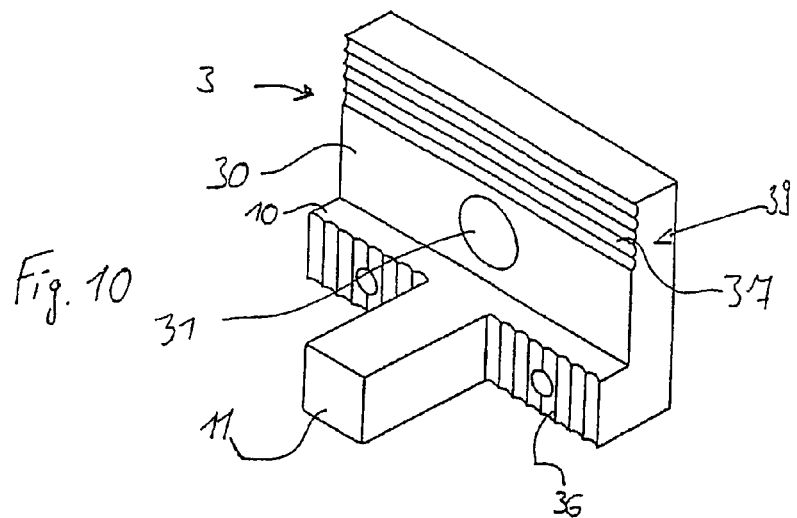
FIGS. 10 and 11 show locking elements illustrated on their own.

FIG. 10 shows a locking element 3 which has a threaded bore 31 for accommodating a screw in the center between two profile elements (not illustrated). A protrusion 11 serves for fixing purposes and a base part 10 serves as a spacer or shoulder for offsetting the profile elements 2 from the base plate 30, and also provided in the region of the base part 10 is ribbing 36, which prevents lateral displacement of the profile elements 2 if the latter butts against the ribbing 36. It is likewise the case that retention devices 37 are formed on the clamping region 39, designed at right angles to the protrusion 11, these retention devices, in the present case, likewise being configured as ribbing 37 and preventing clamped-in structural elements from slipping. It is likewise possible to clamp in profiles, even made of wood, which are wider than the locking element 3.

Figure 11:
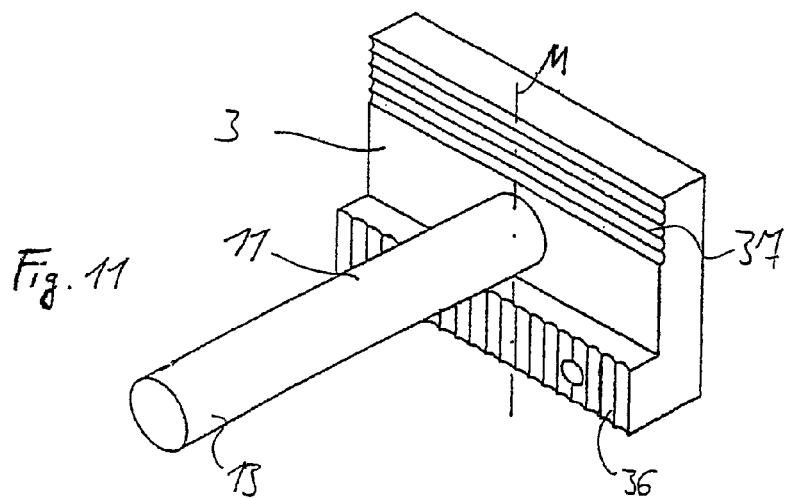
Figure 12:
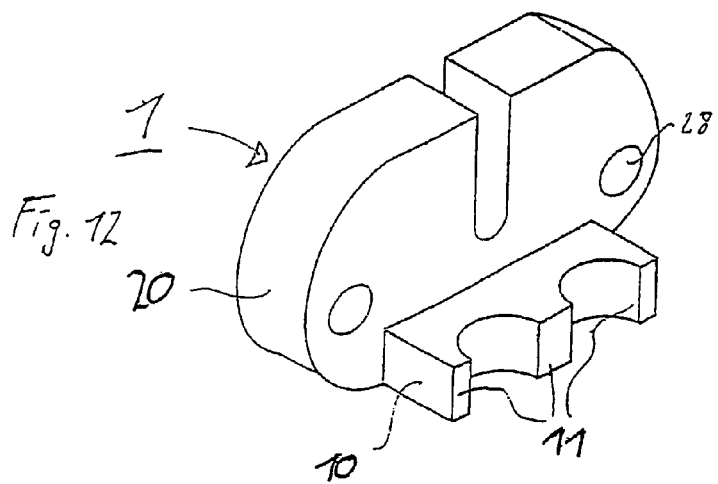
FIG. 12 shows a variant of a clamping element.

FIG. 11 shows a modification of the locking element 3 illustrated in FIG. 10, in the case of which, instead of the threaded bore 31, a tie rod 13 is either screwed into the retaining element 3 or integrally formed on the latter and serves as a protrusion 11. A thread 13 (not illustrated) is produced at that end of the tie rod which is directed toward the clamping element 1, in order to realize a screw connection. Other than a thread, it is also possible to form there an undercut or a recess for the introduction of a clip or of a wedge, by means of which the locking element 3 is braced with the clamping element 1. FIG. 12 shows a variant of the clamping element 1 with fastening bores 28 arranged in the clamping plate 20 and with a base part 10 designed as a shoulder.

Figure 13:
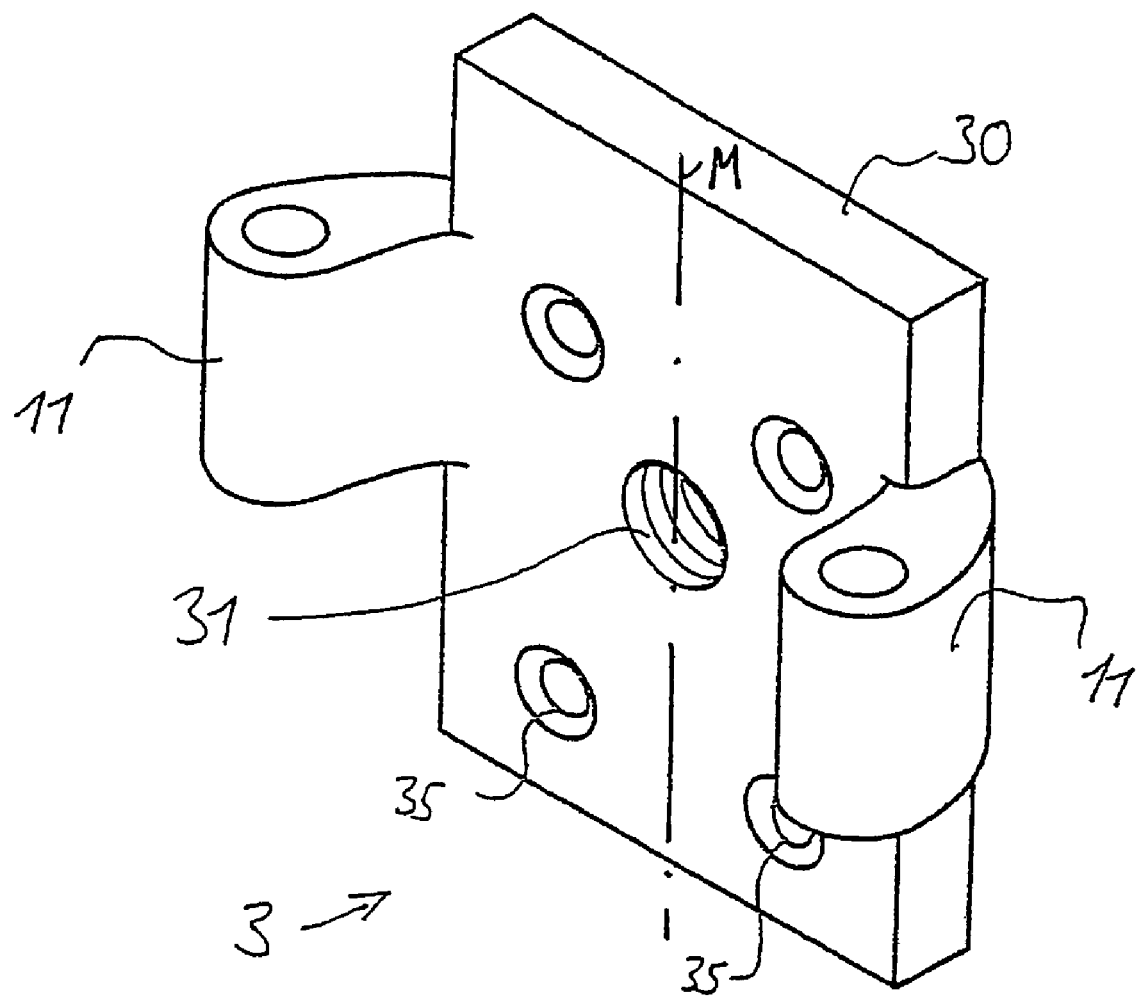
FIG. 13 shows a variant of a locking element.

FIG. 13 illustrates a locking element 3 in which bores or threads 35 are produced, as is a thread 31 for applying the necessary tensile forces. Likewise, hinges in the protrusions 11 are integrally formed on the locking element 3, in which doors or other, pivotable structural part can be fitted. One advantage of this configuration is that, on the one hand, the hinges secure the profile elements (not illustrated), against yielding laterally and, on the other hand, if assembly takes place the other way round, the hinges are located on the rear side of the clamping element 1/locking element 3 combination, this increasing the possible variations for constructing the system.

By virtue of the abovedescribed system or clamping element 1 and locking element 3, it is possible in many sectors, for example for fitting out rooms, in building technology, decoration, storage and fair construction, for commercially available structural parts to be set up in a free-standing manner, to be fastened to one another or else to be coupled to existing structures. It is likewise possible for barriers and railings to be produced, for screens or banners to be fixed or for sales aids or laboratory structures to be erected or coupled to one another. For aesthetic purposes, profiles may be used in a double arrangement and parallel to one another, which increases the stability of the structure as a whole. Using straightforward means which are uncomplicated and inexpensive to produce and use, it is possible to provide virtually unlimited adjustability: a structure of which the parts can be disconnected, reused and combined as desired. Metal or plastic is the material which is preferably used for the elements of the system or of the clamping element. The coatings may be designed for insulating purposes or as corrosion protection or as a means for improving adherence.

Figure 14:
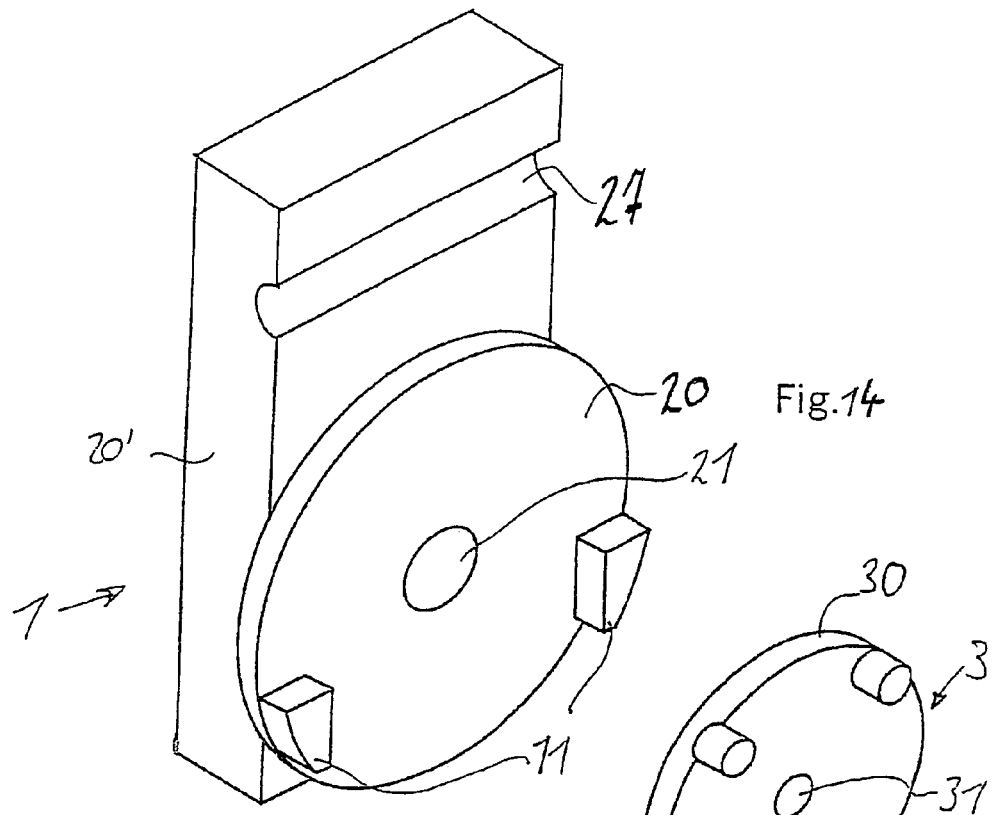
FIG. 14 shows a clamping element with a sub-element variant.

FIG. 14 shows a clamping element 1 comprising a first clamping plate 20 and a second plate 20', which is arranged axially behind the first clamping plate in the bracing direction, and also comprising, opposite the clamping plate 20, a locking element 3. Provided both in the clamping element 1 and in the locking element 3 are devices 21, 31 for bracing the two in relation to one another, these devices being designed here as bores or as threads. The clamping plate 20 is of circular design and has protrusions 11 projecting at right angles from it, it being possible for a profile element or a component or a structural part configured in an appropriately different manner to be positioned against said protrusions. Provided above the clamping plate 20, in the second plate 20' is a more or less semicircular recess 27 for the introduction of cables, round material, threaded rods or the like. The round material positioned in the recess 27 is fixed and secured in conjunction with the profile elements which are to be clamped in. On account of the clamping element 1 being designed in two parts with the first clamping plate 20 and second clamping plate 20' easy capability for angular adjustment of the second clamping plate 20' in relation to the first clamping plate 20 and/or the profile element secured therein is realized.

Arranged on the locking element 3 are fastening devices or protrusions 11 which can accommodate, for example, threads or in which profile elements can likewise be positioned, with the result that this configuration of the locking element 3 allows various segments to be interlinked. It is possible for these protrusions 11 to be designed in one piece or to be fitted subsequently; it is likewise possible for these protrusions 11 to be arranged in a moveable manner and such that they can be secured on the locking element 3, in order to provide for easy adaptability to different use purposes.

Figure 15:
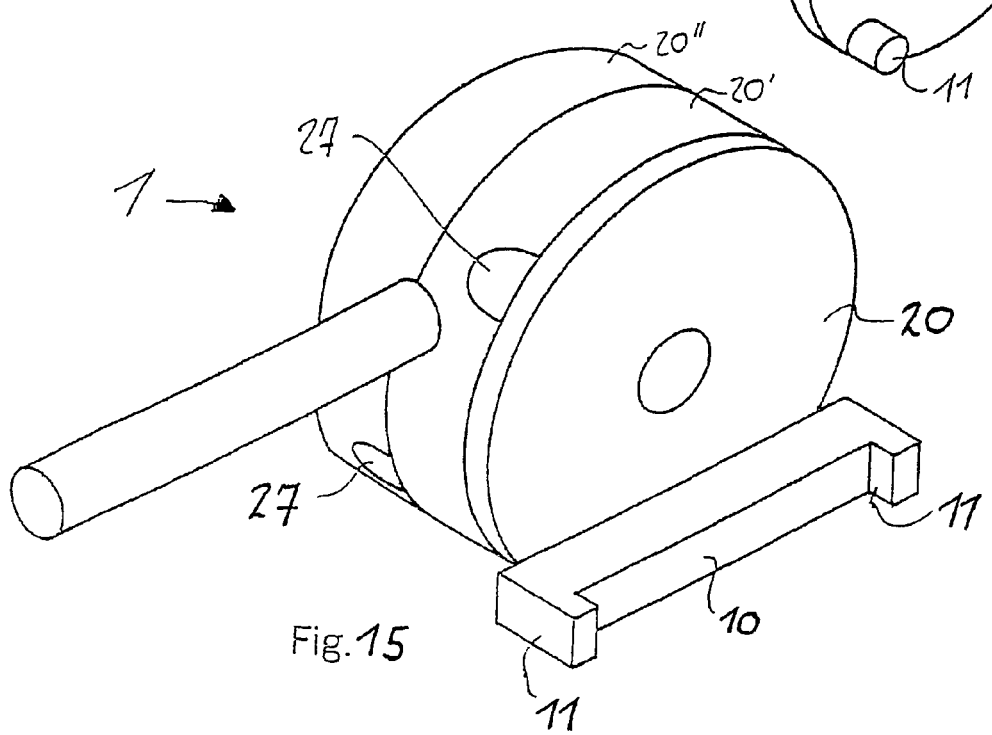
FIG. 15 shows a clamping element constructed in a number of layers.

FIG. 15 shows a clamping element 1 which is constructed from three clamping plates 20, 20' and 20", there being arranged on the first clamping 20 a base part 10 which has protrusions 11 for accommodating a profile element. Produced in the two end sides of the second clamping plate 20' is a recess with a semicircular cross section which can serve either as a fastening for round material or for securing cables; alternatively, in the case of appropriate alignment with a corresponding recess in the third clamping plate 20", it is possible, by placing a corresponding component or structural part in position, to secure the clamping plates 20' and 20" in relation to one another in order thus to achieve a defined angled position. Adjustment is readily possible following withdrawal of said component or structural part, this allowing form-fitting latching in another angled position in which two recesses of different clamping plates are appropriately aligned in relation to one another.

Figure 16:
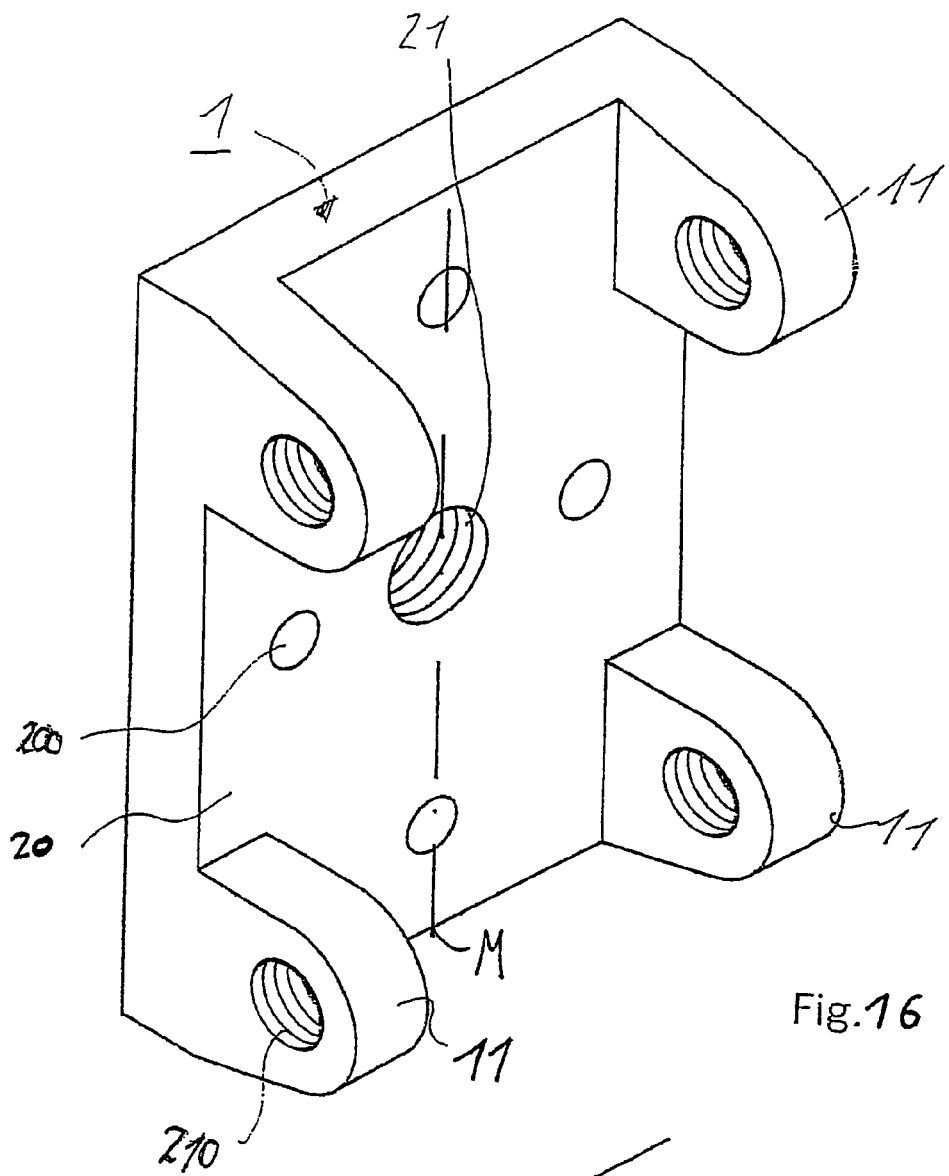
FIG. 16 shows a locking element for different profile units and possible attachment means.

FIG. 16 illustrates a variant of the clamping element 1 which has a rectangular clamping plate 20 with protrusions 11 formed at each of its four corners, the protrusions projecting essentially at right angles from the clamping plate 20. The protrusions 11 are located opposite one another and, between them in each case, have a recess in which profile element can be positioned. The rectangular format of the clamping plate 20 makes it possible, by rotating the clamping element 1 through 90°, to secure different profile widths and/or to adapt to two different profile widths. The protrusions 11 themselves each contain a thread 210, into which screws or threaded rods can be screwed in order either to clamp the profiles firmly or to create possible attachment means or strut arrangements. Recesses 200 are likewise provided in the clamping plate 20, in order for components or structural parts to be positioned there or, for example, for a locking element according to FIG. 1 to be positioned there.

Figure 17:
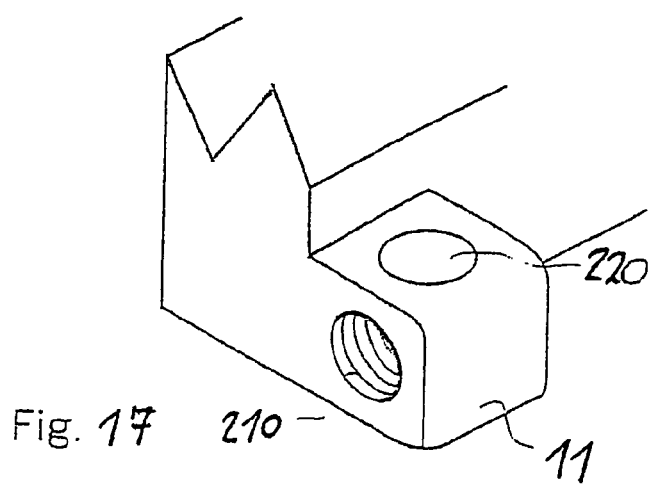
FIG. 17 shows a detail of a variant of a basic part.

FIG. 17 shows a variant of FIG. 16 in the case of which a protrusion 11 is provided with a thread 210 and a bore 220 in order for it to be possible for components or structural parts to be plugged in or fixed.

Figure 18:
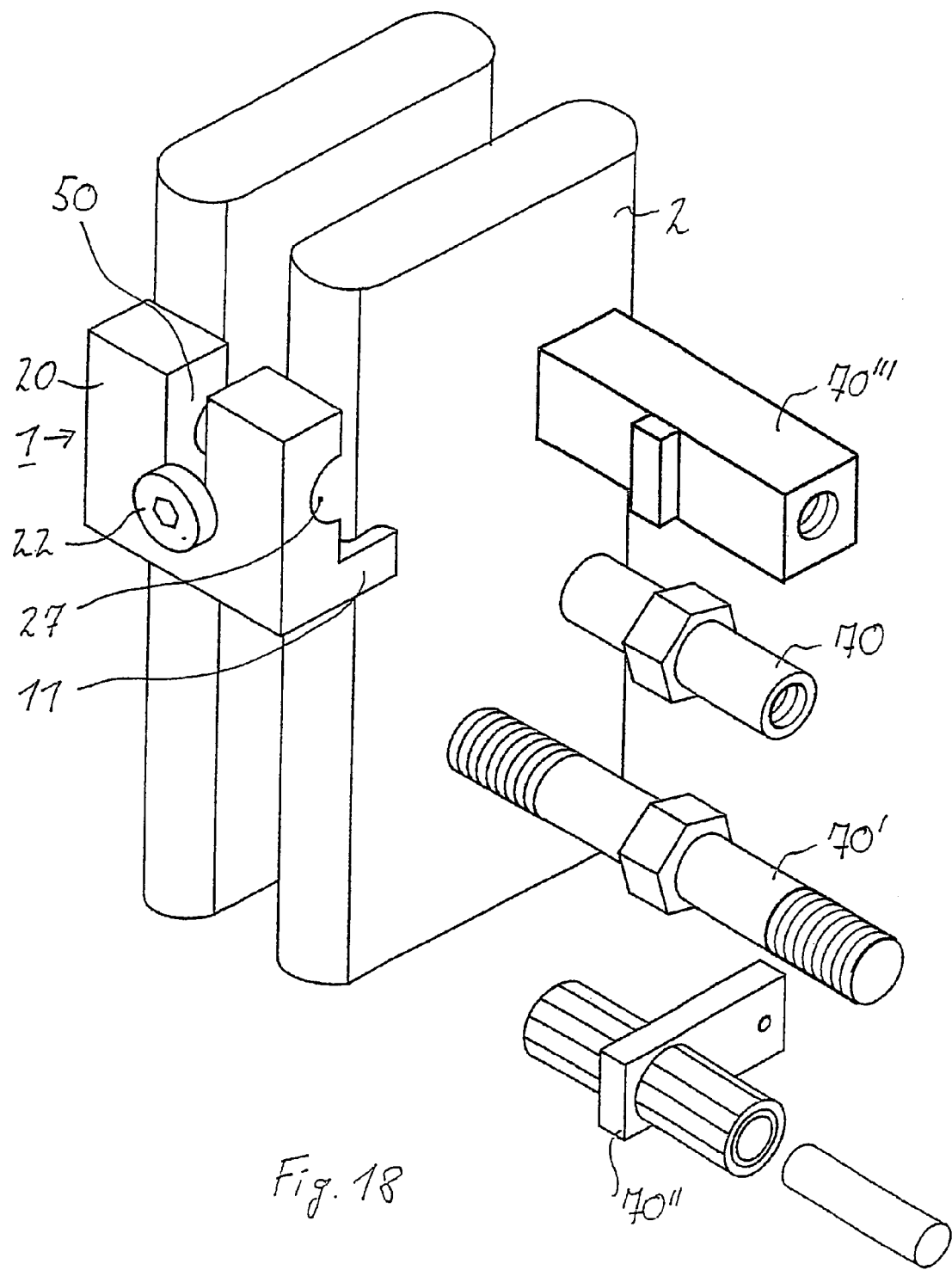
FIG. 18 shows a clamping element with associated functional elements in the partially assembled state.

FIG. 18 shows, in the partially assembled state, two profile elements 2 with a clamping element 1 which is connected, via a screw 22, to a locking element 3 (not illustrated) in order to brace and secure the profile elements 2 in relation to one another. The clamping plate 20 contains a slot 50 which is open in the upward direction and through which, on the one hand, it is possible to introduce the screw 22, although this slot also serves, on the other hand, as a mount for the laterally offset functional elements 70, 70' and 70" provided for assembly purposes. Here too, the clamping plate 20 contains a recess 27, in which the rotary functional parts 70, 70' and 70" can be positioned and braced in relation to the profile elements 2. Providing a hexagonal protuberance makes it possible for the internally threaded or externally threaded functional parts 70 and 70' to be secured in a form-fitting manner between the profile elements and within the slot 50 and to be locked, if appropriate, by a suitable wrench, if the rotary functional part 70, 70' is subjected to a correspondingly high torque. Provided as an alternative to such a hexagonal protuberance is a crosspiece with a form-fitting latching element which can serve, for example, as a bearing bushing for a Venetian blind, for a roller blind or for other elements which are to be rotated. The rotary functional part 70", in the same way as the hexagonal protuberance, may result in interior stabilization of the profile elements 2, so that it is possible to dispense with a central crosspiece provided in the base part. In order to reduce the surface pressure, the functional part 70''' is designed with a quadrilateral cross section, the recess 27 being configured correspondingly.

Figure 19:
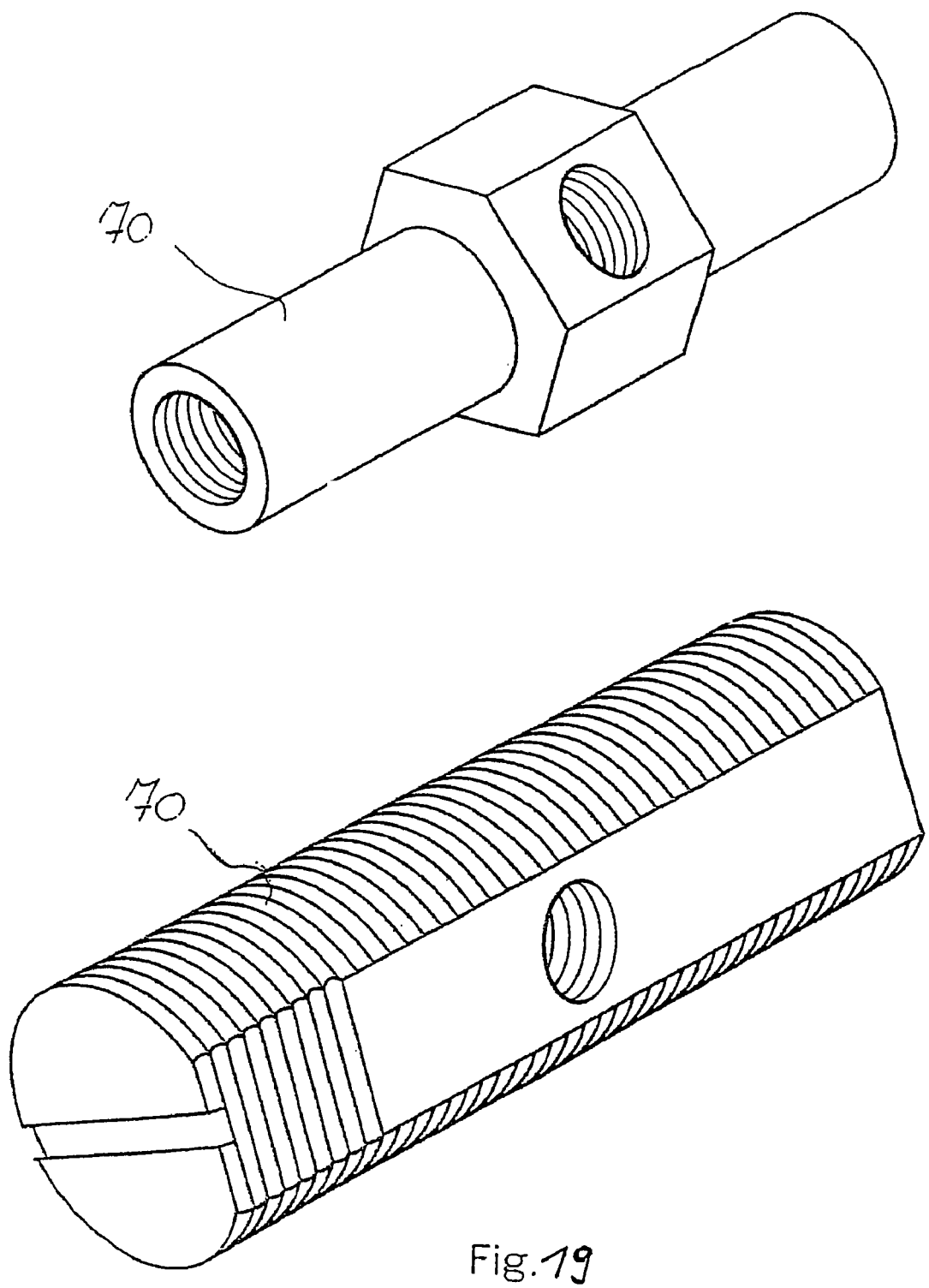
FIG. 19 shows illustrations solely of functional elements as locking elements.

FIG. 19 illustrates different configurations of the rotary functional parts 70 which can be positioned in the recess 27 of the clamping element 1 and act as a locking element, the top functional element being provided with an internal thread and a hexagonal protuberance with a threaded bore running at right angles to the internal thread, with the result that bracing by means of a screw 22 can also take place directly by way of the functional element 70. An alternative to the configuration with an external thread provides for a threaded rod with at least one flattened longitudinal side for position-fixing purposes, it being possible for recesses in the form of a slot or of a hexagon socket to be formed on the end sides in order to effect fixing and alignment within the recess 27 or a corresponding bore. In accordance with the use the conditions, the flattened longitudinal surface may be coated or may have ribbing, straightforward withdrawal thus being rendered more difficult. In a manner analogous to the configuration above, it is also the case here that the functional element has a threaded bore running perpendicularly to the external thread.

Figure 20:
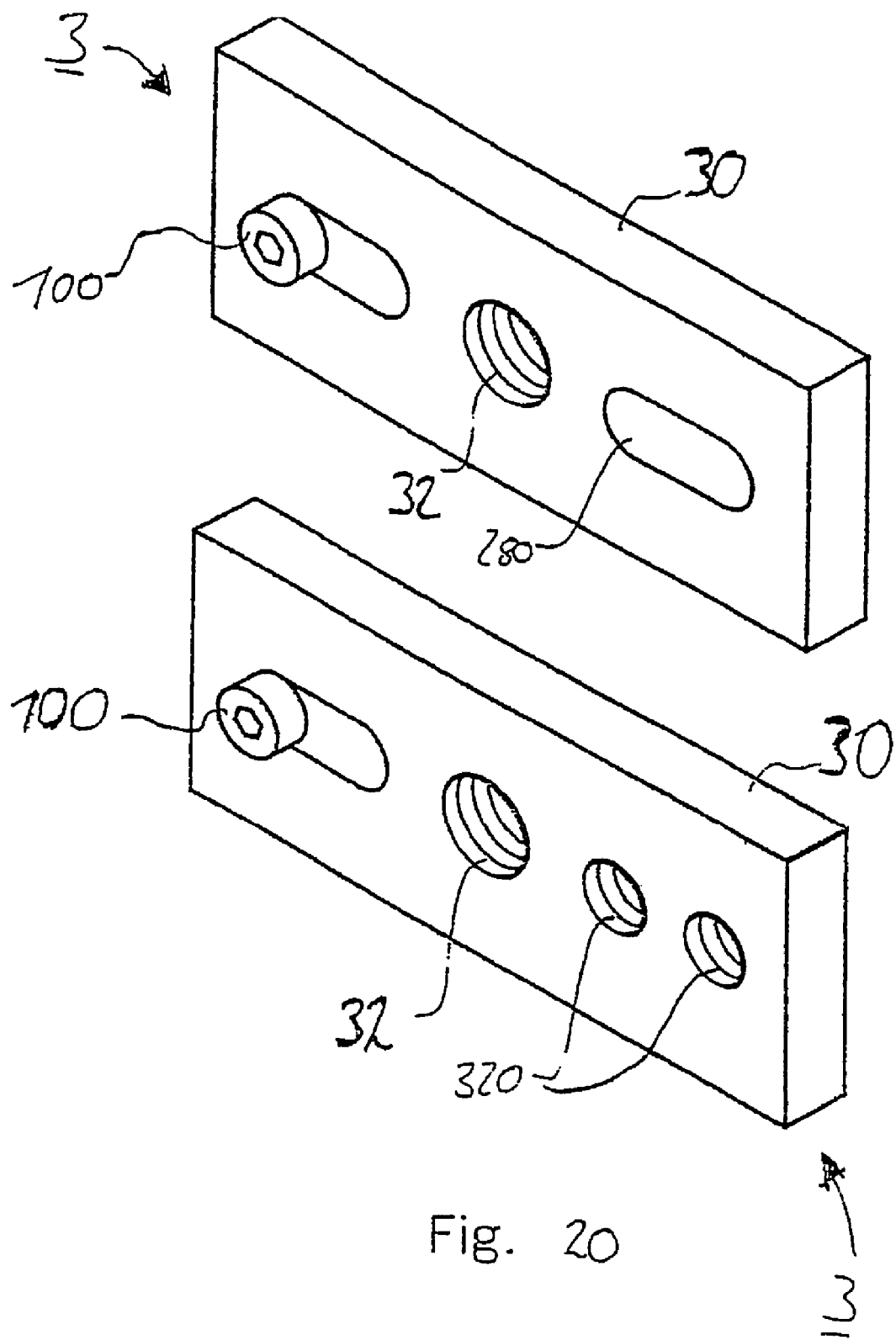
FIG. 20 shows a locking element constructed in a number of parts.

FIG. 20 shows a development of the locking element 3 which comprises a clamping plate 30 and threaded bores 32 arranged therein for bracing with a corresponding clamping element 1. Base elements 100 are provided within the clamping plate 30, the present figure, for reasons of clarity, illustrating just one base element 100. The base element 100 is arranged in a slot and comprises a screw, in this case a hexagon-socket screw, which provides a stop for a profile element 2 (not illustrated). On the side located opposite the thread 32, either a slot 280 is, or two threaded bores 320 are, produced in the clamping plate 30, in order for a base element 100 likewise to be screwed in and/or secured there. A configuration with a slot 280 provides for a capability for stepless adjustment of the interspace 110 between the base elements 100, the adjustment outlay here being higher than for the bottom illustration, in the case of which predetermined positions can be set on account of the threaded bores 320 produced, these serving, at the same time, as a wall fastening.

Figure 21:
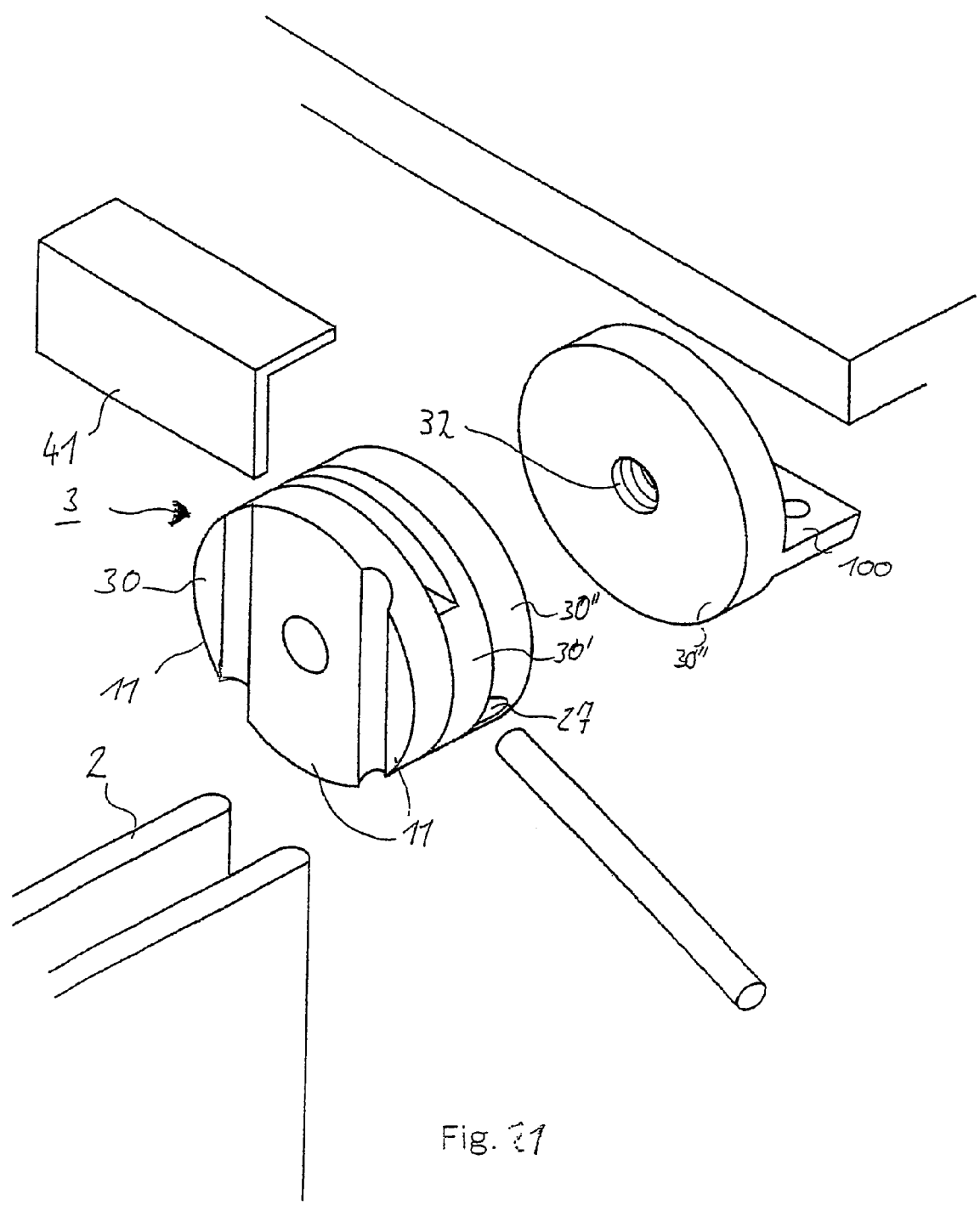
FIG. 21 shows a locking element constructed in a number of layers, with add-on parts placed in position.

FIG. 21 illustrates an alternative configuration of a locking element 3 which is formed from different clamping plates 30, 30', 30", 30''' and on account of the layer-like arrangement, on the one hand, can be extended as desired and, on the other hand, can be varied in terms of the angular adjustment.

In addition, the locking element 3 of FIG. 21 shows that, by virtue of protrusions 11 being arranged on one side and a base element 100 being arranged on the opposite side, on another clamping plate 30''', it is possible for a plurality of structural elements to be lined up one beside the other in the bracing direction, with the result that complex rack systems or constructions such as fair stands or frameworks can be easily realized. The intermediate layers 30' and 30" serve for accommodating various components, or structural parts, or supports 41 with the result that, for example, cables can be laid satisfactorily along a recess 27 parallel to the corresponding supports 41.

Figure 22:
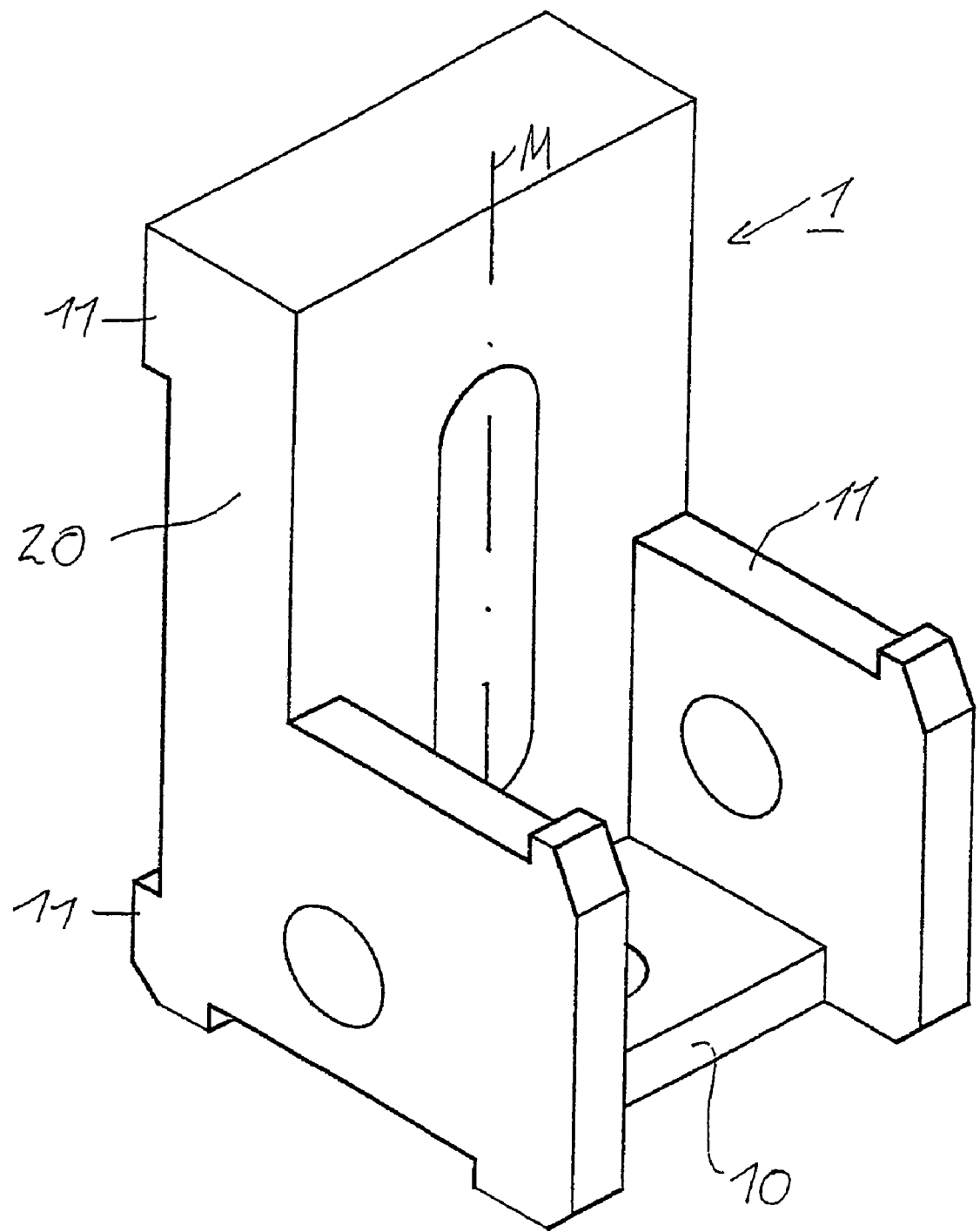
FIG. 22 shows a single-piece clamping element with differently oriented protrusions.

FIG. 22 shows a clamping element 1 with a vertical clamping plate 20 which has a slot-like recess into which devices for bracing with a locking element (not illustrated) can be introduced. Protrusions 11 are formed on both sides of the clamping plate 20 and serve as a stop for profile elements which are to be accommodated and/or placed in position. A base part 10 is arranged at the bottom end between the protrusions 11, which extend in the forward direction, with the result that the clamping element 1 illustrated can serve as a foot or base for constructions or racks. Through the bores within the protrusions 11, it is possible to introduce a multiplicity of fastening or bracing means, and corresponding bracing or fastening of add-on parts can take place.

The invention claimed is:
1. A system for connecting at least two elongnated profile elements comprising:
a separate clamping element comprising a clamping plate and a base arranged essentially perpendicularly to the clamping plate, at least one recess formed in the base such that at least one protrusion projects from the base essentially perpendicularly to the clamping plate, the at least one protrusion acting as a stop by abutting against a side of each profile element, the at least one protrusion preventing, in a form-fitting manner, displacement of the profile elements in a direction perpendicular to a longitudinal extent of the profile elements and parallel to the clamping plate;

a separate locking element comprising a base plate and at least one protrusion arranged essentially perpendicularly to the base plate, the at least one protrusion acting as a stop by abutting against a side of each profile element, the at least one protrusion preventing, in a form-fitting manner, displacement of the profile elements in the direction perpendicular to the longitudinal extent of the profile elements and parallel to the base plate;

wherein, in the assembled state, the locking element butts against a side of each of the profile elements and is located opposite the clamping element, such that the at least one protrusion of the locking element and the at least one protrusion of the clamping element are directed toward one another; and a bracing arrangement that clamps, in the assembled state, the profile elements between the clamping element and the locking element, wherein at least one side of each of the profile elements abut against a wall of the at least one protrusion of the clamping element and a wall of the at least one protrusion of the locking element, wherein the bracing arrangement comprises a bracing device that is at least one of:
arranged, and guided through, essentially centrally between the profile elements, and
arranged, and guided along a center axis of the base plate or of the clamping plate;

wherein the at least one protrusion of the clamping element extends out from the base by an amount that is greater than a thickness of the clamping plate, and wherein a portion of the base extends between the at least one recess and the clamping plate such that, in the assembled state, a clearance is formed for accommodating elognated add-on structural elements between and contacting the profile elements and the clamping plate.

2. The system as claimed in claim 1, wherein the clamping element is a one piece member.

3. The system as claimed in claim 1, wherein the bracing device comprises one of: one or more tie rods, one or more threads, one or more clips, one or more wedge leadthroughs, one or more hooks, one or more nut mounts, and one or more recesses or undercuts.

4. The system as claimed claim 1, wherein the clamping plate is of inclined or curved design in relation to the at least one protrusion of the clamping element.

5. The system as claimed in claim 1, wherein the at least one protrusion of each of the clamping element and the locking element each further comprises two outer protrusions which abut against the profile elements on both outer sides.

6. The system as claimed in claim 1, wherein the profile elements comprise; separate tubes, bars, rails, a U-shaped profile, an I-shaped profile, an H-shaped profile, or an M-shaped profile.

7. The system as claimed in claim 1, wherein the clamping element and the locking element are designed such that they can be lined up axially one behind the other in a bracing direction.

8. The system as claimed in claim 1, wherein the clamping element is a one piece L-shaped member and the at least one protrusion is centrally disposed, and the at least one recess comprises two recesses arranged between the at least one protrusion and two outer protrusions, each of the two recesses comprising a bottom wall and two parallel sidewalls.

9. A clamping element for connecting one elognated profile element to another elognated profile element, to fixed objects or add-on structural elements, comprising:

a clamping plate and a base arranged essentially perpendicularly to the clamping plate, at least one recess formed in the base such that at least one protrusion projects from the base perpendicular to the clamping plate and acts as a stop by abutting against a side of one of the profile elements, the at least one protrusion being designed such that at least one side of the profile element can be positioned against a surface of the base and a wall of the at least one protrusion, the at least one protrusion preventing, in a form-fitting manner, displacement of the profile element in a direction perpendicular to a longitudinal extent of the profile element and parallel to the clamping plate, wherein, a portion of the base extends between the at least one recess and the clamping plate such that in the assembled state, a clearance for accommodating elongated add-on structural elements is provided between the profile element and the clamping plate;

a bracing device for bracing the profile elements between the clamping element and an opposing locking element is provided on the clamping element, wherein the bracing device is arranged along a center axis of the clamping plate, wherein the at least one protrusion extends out from the base by an amount that is greater than a thickness of the clamping plate, and wherein the at least one protrusion is configured such that, in the assembled state, the clearance is structured and arranged to accommodate the add-on structural elements between and in contact with the profile element and the clamping plate.

10. The clamping element as claimed in claim 9, wherein the at least one protrusion further comprises two outer protrusions and the bracing device is arranged such that the profile elements can be arranged between at least one of:
the two outer protrusions; and
one outer protrusion and the bracing device.

11. The clamping element as claimed in claim 9, wherein the at least one protrusion comprises protrusions formed on opposite sides of the clamping plate.

* * * * *